(12) United States Patent
Lee et al.

(10) Patent No.: US 9,998,839 B2
(45) Date of Patent: Jun. 12, 2018

(54) MULTIMEDIA APPARATUS, AND METHOD FOR PROCESSING AUDIO SIGNAL THEREOF

(71) Applicant: LG ELECTRONICS INC., Seoul (KR)

(72) Inventors: Sungtae Lee, Seoul (KR); Jinhong Shin, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days. days.

(21) Appl. No.: 15/511,226

(22) PCT Filed: May 18, 2015

(86) PCT No.: PCT/KR2015/004937
§ 371 (c)(1),
(2) Date: Mar. 14, 2017

(87) PCT Pub. No.: WO2016/043404
PCT Pub. Date: Mar. 24, 2016

(65) Prior Publication Data
US 2017/0257715 A1    Sep. 7, 2017

(30) Foreign Application Priority Data
Sep. 15, 2014 (KR) .................. 10-2014-0121881

(51) Int. Cl.
*H03G 3/20* (2006.01)
*H04R 29/00* (2006.01)
(Continued)

(52) U.S. Cl.
CPC ......... *H04R 29/00* (2013.01); *H04N 21/4394* (2013.01); *H04N 21/4852* (2013.01);
(Continued)

(58) Field of Classification Search
CPC ...................................................... H03G 3/20
See application file for complete search history.

(56) References Cited

U.S. PATENT DOCUMENTS

| | | | |
|---|---|---|---|
| 8,953,814 B2* | 2/2015 | Sibbald | H04M 1/6066 381/71.6 |
| 2002/0136414 A1 | 9/2002 | Jordan et al. | |

(Continued)

FOREIGN PATENT DOCUMENTS

| | | |
|---|---|---|
| JP | 2012054863 | 3/2012 |
| JP | 2014045435 | 3/2014 |

(Continued)

OTHER PUBLICATIONS

PCT International Application No. PCT/KR2015/004937, Written Opinion of the International Searching Authority dated Aug. 21, 2015, 22 pages.

(Continued)

*Primary Examiner* — Olisa Anwah
(74) *Attorney, Agent, or Firm* — Lee, Hong, Degerman, Kang & Waimey PC

(57) ABSTRACT

Disclosed in the present specification are a multimedia apparatus for servicing an optimized sound depending on the surrounding environment and a method for processing an audio signal thereof. The method for processing an audio signal of the multimedia apparatus, according to the present invention, comprises the steps of: receiving an external test sound; analyzing the frequency properties of the received test sound; calculating a compensation value of the test sound according to the analyzed frequency properties; compensating an audio signal to be output, according to the calculated compensation value; and outputting the compensated audio signal.

18 Claims, 33 Drawing Sheets

(51) Int. Cl.
*H04N 21/485* (2011.01)
*H04N 21/439* (2011.01)
*H04R 3/04* (2006.01)

(52) U.S. Cl.
CPC ........... *H04R 3/04* (2013.01); *H04R 2430/01* (2013.01); *H04R 2499/11* (2013.01)

(56) References Cited

U.S. PATENT DOCUMENTS

| | | | |
|---|---|---|---|
| 2013/0066453 A1 | 3/2013 | Seefeldt | |
| 2013/0129097 A1* | 5/2013 | Park | G10L 25/69 381/56 |
| 2014/0177871 A1* | 6/2014 | Morton | H04R 3/04 381/99 |
| 2015/0058885 A1* | 2/2015 | Choi | G10L 21/0224 725/37 |

FOREIGN PATENT DOCUMENTS

| | | |
|---|---|---|
| KR | 1020000028423 | 5/2000 |
| KR | 1020020095725 | 12/2002 |
| KR | 1020070074408 | 7/2007 |
| KR | 1020140044575 | 4/2014 |

OTHER PUBLICATIONS

European Patent Office Application Serial No. 15841557.0, Search Report dated Mar. 16, 2018, 8 pages.

* cited by examiner

MULTIMEDIA APPARATUS, AND METHOD FOR PROCESSING AUDIO SIGNAL THEREOF

CROSS-REFERENCE TO RELATED APPLICATIONS

This application is the National Stage filing under 35 U.S.C. 371 of International Application No. PCT/KR2015/004937, filed on May 18, 2015, and also claims the benefit of earlier filing date, and right of priority of Korean Patent Application No. 10-2014-0121881 filed on Sep. 15, 2014, the contents of which are all hereby incorporated by reference herein in their entirety.

TECHNICAL FIELD

The present invention relates to a multimedia device, and more particularly, to a multimedia device and method of processing an audio signal therein, suitable for servicing optimized sound according to an ambient environment.

BACKGROUND ART

Generally, a multimedia device is a device equipped with a function of receiving and processing a broadcast video a user can view.

And, the multimedia device can display a broadcast, which is selected by a user from broadcast signals broadcasted by a broadcasting station, on a display.

The global tendency of current broadcasting is toward digital broadcasting from analog broadcasting.

Herein, the digital broadcasting means broadcasting of sending digital video and audio signals. Compared to analog broadcasting, digital broadcasting has less data loss owing to its strong resistance to external noise. The digital broadcasting is more advantageous in error correction, has high resolution, and provides a clear screen.

Moreover, the digital broadcasting is able to provide an interactive service unlike the analog broadcasting.

Compared to an existing multimedia device, a recent multimedia device has high performance and multi-functionality. And, services (e.g., Internet service, VOD (video on demand), electronic album service, etc.) usable in a multimedia device are diversified.

Thus, a multimedia device provides various services according to its high performance and multi-functionality, whereby a quality of sound is becoming a significant issue.

However, when an existing multimedia device is shipped in a factory, although acoustic feature is set to an optimal value in advance, the acoustic feature set to the optimal value varies depending on a multimedia device installed place and various ambient environments.

Thus, since a user fails to listen to the optimized acoustic feature according to the factory setting but listens to an acoustic feature varied according to an environment in which a multimedia device is installed or located, there is a problem that the user is not provided with a satisfiable quality of sound.

DISCLOSURE OF THE INVENTION

Technical Task

A technical task of the present invention is to provide a multimedia device and method of processing an audio signal therein, by which sound of an optimal value can be provided according to a multimedia device installed place and various ambient environments in a manner of calculating a compensation value by analyzing frequency characteristic of a received test sound, correcting an audio signal with the calculated compensation value, and then outputting the corrected audio signal.

Technical tasks obtainable from the present invention are non-limited by the above-mentioned technical task. And, other unmentioned technical tasks can be clearly understood from the following description by those having ordinary skill in the technical field to which the present invention pertains.

Technical Solutions

In one technical aspect of the present invention, provided herein is a method of processing an audio signal in a multimedia device, including 1receiving an external test sound, analyzing frequency characteristic of the received test sound, calculating a compensation value of the test sound according to the analyzed frequency characteristic, correcting an audio signal to output according to the calculated compensation value, and outputting the corrected audio signal.

Herein, the receiving the external test sound may include receiving a sound compensation request signal, if the sound compensation request signal is received, displaying a manual/auto adjustment selection window for the sound compensation, if manual adjustment is selected through the manual/auto adjustment selection window, outputting the test sound, and receiving the outputted test sound.

And, after receiving the test sound, a compensation value manual adjustment window including the frequency characteristic of the received test sound may be displayed.

In some cases, the compensation value manual adjustment window may include a recommended compensation value corresponding to each frequency of the test sound.

Moreover, the displaying the manual/auto adjustment selection window for the sound compensation may include if auto adjustment is selected through the manual/auto adjustment selection window, outputting the test sound, receiving the outputted test sound, measuring a next reception time of the test sound, checking whether a preset reception time expires, and if the reception time expires, receiving a currently outputted test sound.

And, the outputted test sound may include at least one of a preset white noise signal, a preset sweep signal, and a sound signal of a currently displayed video.

In another technical aspect of the present invention, provided herein is a multimedia device, including a sound receiving module receiving an external test sound, a sound transmitting module outputting the test sound, a display module displaying a manual/auto adjustment selection window for sound compensation, and a controller configured to analyze frequency characteristic of the received test sound, calculate a compensation value of the test sound according to the analyzed frequency characteristic, correct an audio signal to output according to the calculated compensation value, and output the corrected audio signal.

Herein, if manual adjustment is selected through the manual/auto adjustment selection window, the controller may create a compensation value manual adjustment window including the frequency characteristic of the received test sound and display the created window on the display module.

And, if manual adjustment is selected through the manual/auto adjustment selection window, the controller may create a compensation value manual adjustment window including the frequency characteristic of the received test sound and a recommended compensation value corresponding to each frequency of the test sound and display the created window on the display module.

Moreover, when the controller analyzes the frequency characteristic of the test sound, the controller may analyze a noise signal associated with external noise and then adjust a volume level of the audio signal according to a strength of the analyzed noise signal. Or, when the controller analyzes the frequency characteristic of the test sound, the controller may analyze a volume of a sound according to user's channel switching and then adjust a volume level of the audio signal uniformly according to the analyzed volume.

Technical solutions obtainable from the present invention are non-limited by the above-mentioned technical solutions. And, other unmentioned technical solutions can be clearly understood from the following description by those having ordinary skill in the technical field to which the present invention pertains.

Advantageous Effects

According to one embodiment of the present invention, sound of an optimal value can be provided according to a multimedia device installed place and various ambient environments in a manner of calculating a compensation value by analyzing frequency characteristic of a received test sound, correcting an audio signal with the calculated compensation value, and then outputting the corrected audio signal.

Accordingly, the present invention always outputs an optimal sound in various environments, thereby providing user convenience without limitations put on installation environments as well as providing a user with a satisfiable sound quality service.

Effects obtainable from the present invention are non-limited by the above mentioned effect. And, other unmentioned effects can be clearly understood from the following description by those having ordinary skill in the technical field to which the present invention pertains.

BEST MODE FOR INVENTION

Reference will now be made in detail to the preferred embodiments of the present invention, examples of which are illustrated in the accompanying drawings.

As used herein, the suffixes 'module', 'unit' and 'part' are used for elements in order to facilitate the disclosure only. Therefore, significant meanings or roles are not given to the suffixes themselves and it is understood that the 'module', 'unit' and 'part' can be used together or interchangeably.

In the following detailed description of the invention includes details to help the full understanding of the present invention. Yet, it is apparent to those skilled in the art that the present invention can be implemented without these details. And, the present invention may be non-limited by the preferred embodiments of the present invention.

Although terminologies used in the present specification are selected from general terminologies used currently and widely in consideration of functions in the present invention, they may be changed in accordance with intentions of technicians engaged in the corresponding fields, customs, advents of new technologies and the like. Occasionally, some terminologies may be arbitrarily selected by the applicant(s). In this case, the meanings of the arbitrarily selected terminologies shall be described in the corresponding part of the detailed description of the invention. Therefore, terminologies used in the present specification need to be construed based on the substantial meanings of the corresponding terminologies and the overall matters disclosed in the present specification rather than construed as simple names of the terminologies.

Meanwhile, 'multimedia device' described in the present specification is a multimedia device having a computer support function added to a broadcast receiving function for example. As a multimedia device has an internet function and the like added thereto while faithful to the broadcast receiving function, it can be equipped with an interface more convenient in use than a manual input device, a touchscreen, a space remote controller and the like.

A multimedia device is connected to Internet and computer with the support of wire or wireless internet function, thereby executing functions such as e-mail, web browsing, banking, gaming and the like. For such various functions, a multimedia device may use a standardized universal OS (operating system).

Hence, a multimedia device disclosed in the present invention can freely add or delete various application specifications on Universal OS kernel for example, through which various user-friendly functions can be executed.

In detail, a multimedia device may include a network TV, an HBBTV, a smart TV or the like for example. In some cases, a multimedia device is applicable to a smartphone.

Figure 1:
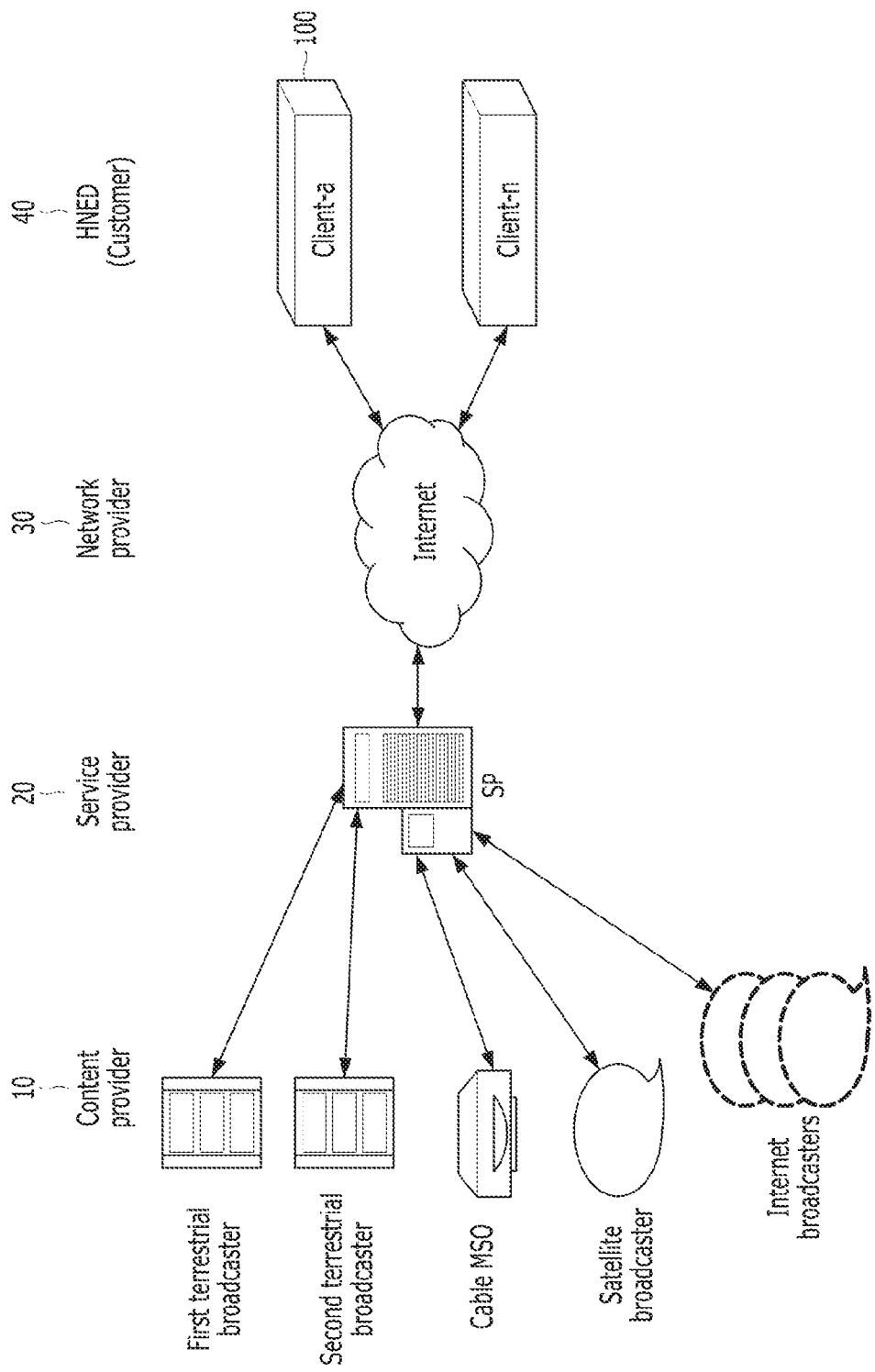
FIG. 1 is a schematic diagram illustrating a broadcasting system including a multimedia device according to one embodiment of the present invention.

FIG. 1 is a schematic diagram illustrating a broadcasting system including a multimedia device according to the present invention.

Referring to FIG. 1, a broadcasting system may include a content provider (CP) 10, a service provider (SP) 20, a network provider (NP) 30, and a home network end user (HNED) 40.

Herein, the HNED 40 may correspond to s a client 100, that is, a multimedia device. The client 40 corresponds to a multimedia device. And, the multimedia device may include one of a network TV, a smart TV, an IPTV and the like for example.

And, the CP 10 may produce and provide various contents.

Herein, the CP 10 may include a terrestrial broadcaster, a cable system operator (SO), a multiple system operator (MSO), a satellite broadcaster, an Internet broadcaster, etc.

Moreover, the CP 10 may provide various applications and the like as well as well as broadcast contents.

The SP 20 may service-packetize and provide contents produced by the CP 10.

For instance, the SP 20 packetizes a first terrestrial broadcast, a second terrestrial broadcast, a cable MSO, a satellite broadcast, various internet broadcasts, applications and the like and then provides it to a user.

Meanwhile, The SP 20 may provide services to the client 100 in a uni-cast or multi-cast manner.

Herein, the unicast manner is a scheme of sending data between a single sender and a single recipient by 1:1.

For instance, in case of the unicast manner, if a receiver makes a request for data to a server, the server can send data to the received in response to the request.

And, the multi-cast manner is a scheme of sending data to a multitude of recipients of a specific group.

For instance, a server can collectively send data to a multitude of pre-registered receivers. For such a multicast registration, it is able to use IGMP (internet group management protocol) and the like.

The NP 30 may provide a network to provide a service to the client 100.

Herein, the client 100 may be provided with a service by establishing a home network (i.e., home network end user: HNED).

The broadcasting system including the multimedia device may use a conditional access or content protection as a means for protecting a transmitted content.

For one example of a means for the conditional access or the content protection, a cable card (CableCARD) or a downloadable CAS (DCAS) or the like may be usable.

Meanwhile, the client 100 may be able to provide contents through a network. In this case, on the contrary, the client 100 can directly serve as a content provider. And, the CP 10 may receive contents from the client 100.

According to the above design, an interactive contents or data service is available advantageously.

Figure 2:
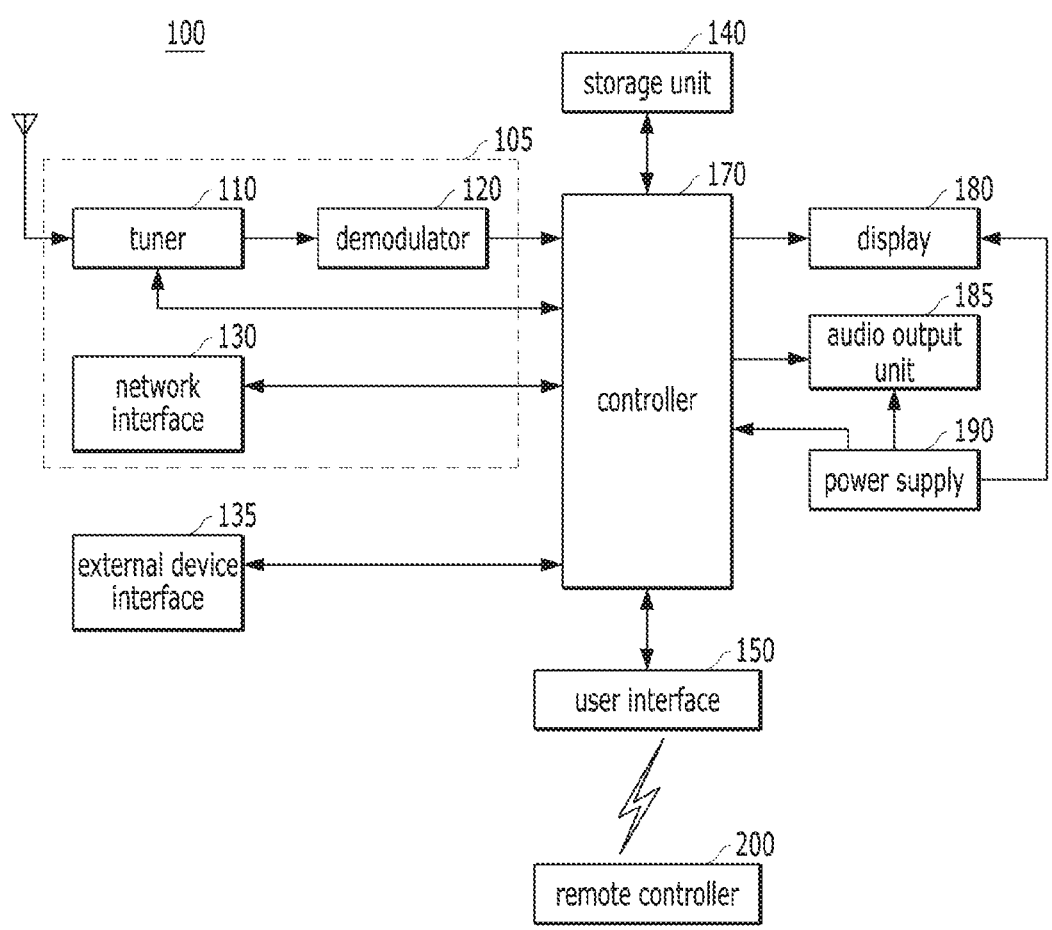
FIG. 2 is a block diagram showing the multimedia device shown in FIG. 1.

FIG. 2 is a block diagram showing the configuration of the multimedia device shown in FIG. 1.

Referring to FIG. 2, a multimedia device 100 may include a broadcast receiving unit 105, an external device interface 135, a storage unit 140, a user input interface 150, a controller 170, a display unit 180, an audio output unit 185, and a power supply unit 190.

The broadcast receiving unit 305 may include a tuner 110, a demodulator 120, and a network interface 130.

Of course, if necessary, the broadcast receiving unit 105 may be designed to include the tuner 110 and the demodulator 120 without the network interface 130, or include the network interface 130 without the tuner 110 and the demodulator 120.

The tuner 110 may select radio frequency (RF) broadcast signals corresponding to a channel selected by the user or all previously stored channels among RF broadcast signals received through an antenna. And, the tuner 110 may convert the received RF broadcast signal into an IF (intermediate frequency) signal or a baseband video or audio signal.

The tuner 110 may receive an RF broadcast signal of a single carrier according to ATSC (advanced television system committee) or an RF broadcast signal of multiple carriers according to DVB (digital video broadcasting).

The demodulator 120 performs demodulation and channel decoding and is then able to output a stream signal TS.

The stream signal outputted from the demodulator 120 may be inputted to the controller 170. The controller 170 performs demultiplexing, audio/video signal processing, etc. Furthermore, the controller 170 outputs video and audio to the display 180 and o the audio output unit 185, respectively.

The external device interface 135 may provide an interfacing environment between the multimedia device 300 and an external device.

The external device interface 135 can be connected with external devices such as a digital versatile disk (DVD), a Blu-ray player, a game device, a camera, a camcorder, a computer (notebook computer), and the like by wire/wireless.

The external device interface 135 delivers a video, audio or data signal inputted externally through the connected external device to the controller 170 of the multimedia device. And, the external device interface 135 may output the video, audio or data signal processed by the controller 170 to the connected external device.

To this end, the external device interface 135 may further include an A/V input/output unit (not shown) or a wireless communication unit (not shown).

In order to input video and audio signals of an external device to the multimedia device 100, the A/V input/output unit may include a USB (Universal Serial Bus) terminal, a composite video banking sync (CVBS) terminal, a component terminal, an S-video terminal (analog), a digital visual interface (DVI) terminal, a high definition multimedia interface (HDMI) terminal, an RGB terminal, a D-SUB terminal, etc.

The external device interface 135 is connected to a camera module and may be then able to receive an external test sound through a sound receiving unit of the camera module.

Herein, the external test sound may include a test sound signal already signal-processed by an audio signal processing unit of the camera module.

Alternatively, the external test sound may include a test sound signal converted into a digital signal without signal processing.

Alternatively, the external test sound may include an analog signal.

And, the external device interface 135 is connected to a module other than the camera module and may be then able to receive an external test sound through a sound receiving unit of the corresponding module.

Alternatively, the external test sound may be received through the sound receiving unit of the multimedia device without passing through the external device interface 135.

Herein, the test sound may include at least one of a preset white noise signal, a preset sweep signal, and a sound signal of a currently displayed video.

The wireless communication unit may perform short-range wireless communication with another multimedia device.

The multimedia device 100 may be networked with other multimedia devices by communication protocols such as Bluetooth, radio frequency identification (RFID), infrared data association (IrDA), ultra wideband (UWB), ZigBee, and digital living network alliance (DLNA), etc. for example.

The external device interface 135 may perform input/output operations with a set-top box (STB) by being connected thereto through at least one of various set-top boxes and the aforementioned terminals.

The network interface 130 may provide an interface for connecting the multimedia device 100 to wired/wireless networks including Internet network. The network interface 130 may have Ethernet terminal and the like for an access to a wired network for example. For the access to the wireless network, the network interface 130 may use communication specifications such as WLAN (Wireless LAN) (Wi-Fi), Wibro (Wireless broadband), Wimax (World Interoperability for Microwave Access), HSDPA (High Speed Downlink Packet Access), etc.

The network interface 130 may transceive data with another user or another multimedia device through the accessed network or another network linked to the accessed network.

The storage unit 140 may store programs for various signal processing and controls within the controller 170, and may also store a processed video, audio or data signal.

In addition, the storage unit 140 may execute a function of temporarily storing a video, audio or data signal inputted from the external device interface 135 or the network interface 130. The storage unit 140 may store information on a prescribed broadcast channel through a channel memory function.

The storage unit 140 may include storage media of one or more types, such as a flash memory type, a hard disk type, a multimedia card micro type, a card type memory (e.g. SD or XD memory), RAM, EEPROM, etc.

The multimedia device 100 may play content files (a video file, a still image file, a music file, a text file, an application file, etc.) stored in the storage unit 140 and provide them to the user.

FIG. 2 illustrates an embodiment in which the storage unit 140 is separated from the controller 170, by which the present invention is non-limited. In other words, the storage unit 140 may be included in the controller 170.

The user input interface 150 may forward a signal inputted by a user to the controller 170 or forward a signal outputted from the controller 170 to the user.

For example, the user input interface 150 may receive control signals for power on/off, channel selection, screen settings and the like from a remote controller 500, or transmit control signals of the controller 170 to the remote controller 500, according to various communication schemes such as RF communication, IR communication, and the like.

For instance, the user input interface 150 can forward control signals inputted through a local key (not shown) such as a power key, a channel key, a volume key, a setup key, or the like to the controller 170.

The user interface 150 may receive a cursor display signal for displaying a cursor on a screen from the remote controller 200 and then process it or forward it to the controller 170.

The controller 170 may generate and output a signal for a video or audio output by demultiplexing a stream inputted through the tuner 110, the demodulator 120 or the external device interface 135 or processing demultiplexed signals.

A video signal processed by the controller 170 can be inputted to the display unit 380 and displayed as an image corresponding to the video signal.

In addition, the video signal video-processed by the controller 170 can be inputted to an external output device through the external device interface 135.

An audio signal processed by the controller 170 can be audio-outputted to the audio output unit 185. Moreover, the audio signal processed by the controller 170 can be inputted to the external output device through the external device interface 135.

Moreover, the controller 170 may analyze frequency characteristic of an externally received test sound, calculate a compensation value of the test sound according to the analyzed frequency characteristic, and correct an audio signal to output according to the calculated compensation value.

Then, the controller 170 may output the corrected audio signal through the audio output unit 185.

If receiving a sound compensation request signal from a user, the controller 170 may create a manual/audio adjustment selection window for the sound compensation and display it on the display 180.

If a manual adjustment is selected from the manual/audio adjustment selection window, the controller 170 may create a compensation value manual adjustment window including the frequency characteristic of the received test sound and then display it on the display 180.

If a manual adjustment is selected from the manual/audio adjustment selection window, the controller 170 may create a compensation value manual adjustment window including the frequency characteristic of the received test sound and a recommended compensation value corresponding to each frequency of the test sound and then display it on the display 180.

Moreover, if an auto adjustment is selected from the manual/audio adjustment selection window, the controller 170 may receive a currently outputted test sound by preset predetermined periods.

When the controller 170 analyzes frequency characteristic of a test sound, the controller 170 may analyze a noise signal associated with external noise and then adjust a volume level of an audio signal according to a strength of the analyzed noise signal. When the controller 170 analyzes frequency characteristic of a test sound, the controller 170 may analyze a volume of a sound according to user's channel switching and then adjust a volume level of an audio signal uniformly according to the analyzed volume.

The display unit 180 may convert each of a video signal, a data signal, and an OSD signal processed by the controller 170 or each of a video signal and a data signal received from the external device interface 135 into R, G and B signals to generate a drive signal.

The display unit 180 may display a manual/audio adjustment selection window for sound compensation. In some cases, the display unit 180 may display a compensation value manual adjustment window.

The audio output unit 185 receives a signal audio-processed by the controller 170, for example, a stereo signal, a 3.1 channel signal or a 5.1 channel signal, and then outputs the received signal as audio.

The audio output unit 185 may be configured as one of speakers of various types.

Herein, the audio output unit 185 may output an audio signal corrected by the controller 170.

The audio output unit 185 may output a preset test sound according to a control signal of the controller 170.

Herein, the test sound may include at least one of a preset white noise signal, a preset sweep signal, and a sound signal of a currently displayed video.

The power supply unit 190 may supply a corresponding power to the multimedia device 100 overall.

The remote controller 500 sends a user input (e.g., a cursor display input, etc.) to the user input interface 150. To this end, the remote controller 500 can use Bluetooth, RF communication, IR communication, UWB, ZigBee, etc.

In addition, the remote controller 500 may receive audio, video or data signal outputted from the user input interface 150 and then display the received signal or output the same as audio or vibration.

The above-described multimedia device 100 may include a digital broadcast receiver capable of a stationary type, which is capable of receiving at least one of a digital broadcast of ATSC (8-VSB), a digital broadcast of DVB-T (COFDM), a digital broadcast of ISDB-T (BST-OFDM), and the like.

In some cases, the multimedia device 100 may receive a video content through the network interface 130 or the external device interface 135 and play the received video content, without including the tuner 110 and the demodulator 120 shown in FIG. 2.

The multimedia device 100 is a video signal processing device configured to execute a signal processing of a video stored in the device or an inputted video, and may include one of a set-top box except the display 180 and the audio output unit 185 shown in FIG. 2, a DVD player, a Blu-ray player, a game device, a computer, and the like.

Figure 3:
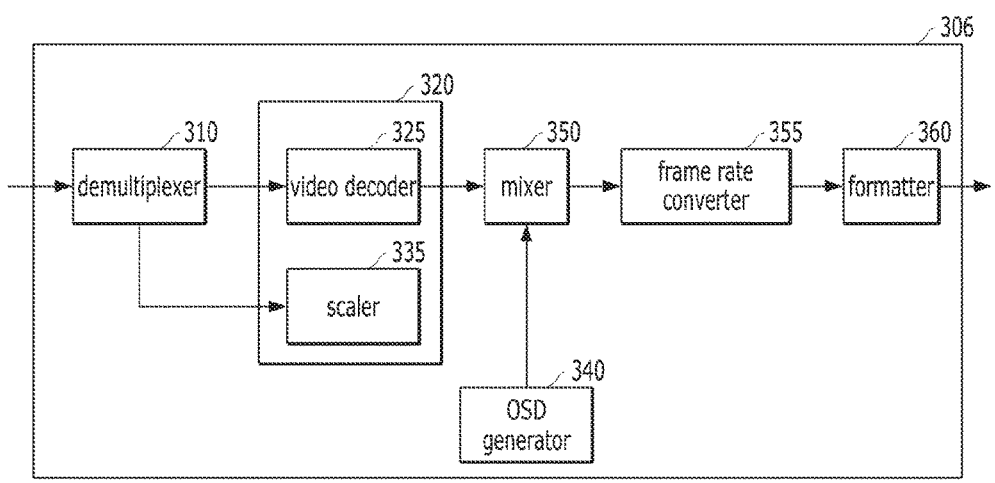
FIG. 3 is a block diagram showing details of a controller shown in FIG. 2.

FIG. 3 is a block diagram showing details of the controller shown in FIG. 2.

Referring to FIG. 3, a controller 306 of a multimedia device may include a demultiplexer 310, a video processor 320, an OSD generator 340, a mixer 350, a frame rate converter (FRC) 355, a formatter 360, and the like. Besides, the controller may be designed to further include an audio processor (not shown) and a data processor (not shown).

The demultiplexer 310 demultiplexes an inputted stream. For instance, if MPEG-2 TS is inputted, the demultiplexer 310 can demultiplex the inputted MPEG-2 TS to separate into video, audio and data signals.

The video processor 320 performs a video processing of the demultiplexed video signal. To this end, the video processor 320 may include a video decoder 325 and a scaler 335. The video decoder 325 can decode the demultiplexed video signal, and the scaler 335 can scale the resolution of the decoded video signal to be outputtable from the display. And, the video signal decoded by the video processor is inputted to the mixer 350.

The OSD generator 340 may generate OSD data according to a user input or by itself. Hence, the mixer 350 can mix the OSD data generated by the OSD generator 340 and the video signal processed by the video processor 320.

The mixed signal is then provided to the formatter 360. By mixing the decoded video signal or the external input signal and the OSD data, OSD can be displayed in a manner of overlaying a broadcast video or an external input video.

The frame rate converter (FRC) 355 may convert a frame rate of an inputted video. For example, the frame rate converter 355 can convert the frame rate into 120 Hz or 240 Hz.

And, the formatter 360 receives an output signal of the frame rate converter 355, changes a format of the signal to fit an output format of the display unit, and then outputs the changed signal. For example, the formatter 360 can output an RGB data signal. In this case, this RGB data signal can be outputted as low voltage differential signal (LVDS) or mini-LVDS.

Particularly, an embodiment of the present invention is described as follows.

The OSD generator 340 generates an OSD for selecting an electronic device and function desired to be controlled by the remote controller. In order to make a structure in which a normal broadcast screen and the OSD overlay each other, the mixer 350 is further designed.

Figure 4:
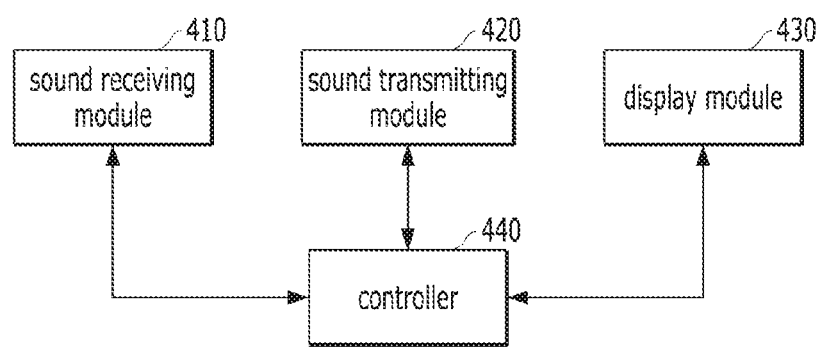
FIG. 4 is a block diagram showing details of configuration modules of a multimedia device according to another embodiment of the present invention.

FIG. 4 is a block diagram showing details of configuration modules of a multimedia device according to another embodiment of the present invention. By referring to FIGS. 1 to 3, modules of a multimedia device shown in FIG. 4 can be added or changed in part. And, the scope of the right of the present invention is not determined based on the elements disclosed in FIGS. 1 to 3 and the like but construed according to the matter disclosed in the appended claims basically.

As shown in FIG. 4, a multimedia device 400 may include a sound receiving module 410, a sound transmitting module 420, a display module 430, a controller 440 and the like.

Herein, the sound receiving module 410 may receive an external test sound.

Herein, the sound receiving module 410 may be embedded in the multimedia device 400 or disposed in an external camera module.

For instance, the camera module includes the sound receiving module 410 and an audio signal processing unit. Hence, the camera module signal-processes a test sound received from the sound receiving module 410 and then sends it to the controller 440.

Alternatively, the camera module may send a test sound, which is received from the sound receiving module 410 installed inside the camera module, as an analog signal intact to the controller 440.

Alternatively, the camera module includes the sound receiving module 410 and an audio signal converting unit for converting an analog signal into a digital signal, and may send a test sound, which is received from the sound receiving module 410 installed inside the camera module, to the controller 440 in a manner of converting the test sound into a digital sound from an analog signal.

The sound transmitting module 420 may output a test sound or an audio signal corrected by the controller 440.

Herein, the outputted test sound may include at least one of a preset white noise signal, a preset sweep signal, and a sound signal of a currently displayed video, by which the present invention is non-limited.

The display module 430 may display a manual/auto adjustment selection window for sound compensation and a compensation value manual adjustment window according to a control signal of the controller 440.

The controller 440 may control operations of the multimedia device overall.

Herein, the controller 400 may analyze frequency characteristic of a received test sound, calculate a compensation value of the test sound according to the analyzed frequency characteristic, correct an audio signal to output according to the calculated compensation value, and output the corrected audio signal through the sound transmitting module 420.

If the manual adjustment is selected from the manual/auto adjustment selection window, the controller 440 may create a compensation value manual adjustment window including the frequency characteristic of the received test sound and then display it on the display module 430.

If the manual adjustment is selected from the manual/audio adjustment selection window, the controller 440 may create a compensation value manual adjustment window including the frequency characteristic of the received test sound and a recommended compensation value corresponding to each frequency of the test sound and then display it on the display 180.

Alternatively, when the controller 440 analyzes frequency characteristic of a test sound, the controller 440 may analyze a noise signal associated with external noise and then adjust a volume level of an audio signal according to a strength of the analyzed noise signal.

Alternatively, when the controller 170 analyzes frequency characteristic of a test sound, the controller 170 may analyze a volume of a sound according to user's channel switching and then adjust a volume level of an audio signal uniformly according to the analyzed volume.

FIGS. 5 to 10 are block diagrams showing details of configuration modules of a multimedia device according to further embodiment of the present invention.

Figure 5:
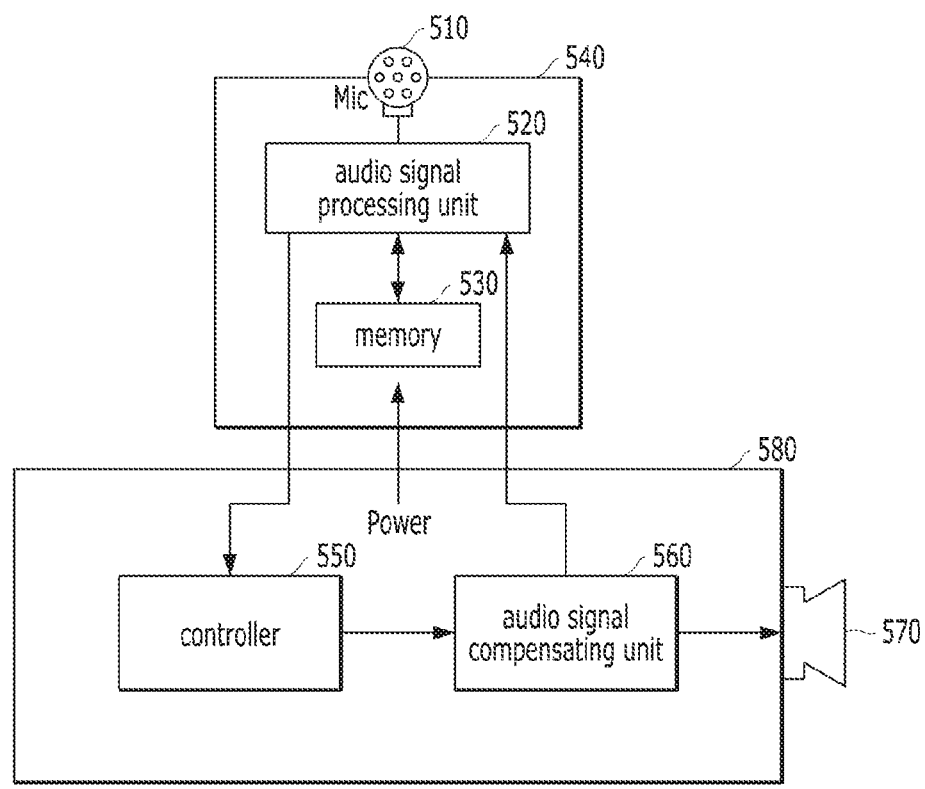
FIGS. 5 to 10 are block diagrams showing details of configuration modules of a multimedia device according to further embodiment of the present invention.

Referring to FIG. 5, a multimedia device 580 may be connected to an external module 540 including a sound receiving unit 510 capable of receiving an external test sound.

Herein, the external module 540 may include a camera module, a prescribed module of an external device, a portable device of USB type, or the like.

The external module 540 may include a sound receiving unit 510, an audio signal processing unit 520, and a memory 530.

Hence, the external module 540 may receive an external test sound through the sound receiving unit 510 (e.g., microphone, etc.), signal-process the received test sound through the audio signal processing unit 520, and send it to a controller 550 of the multimedia device 580.

Herein, the controller 550 of the multimedia device 580 may receive the signal-processed test sound, calculate a compensation value of the test sound, and correct an audio signal to output according to the compensation value through the audio signal compensating unit 560.

The audio output unit of the multimedia device 580 may output the corrected audio signal.

Figure 6:
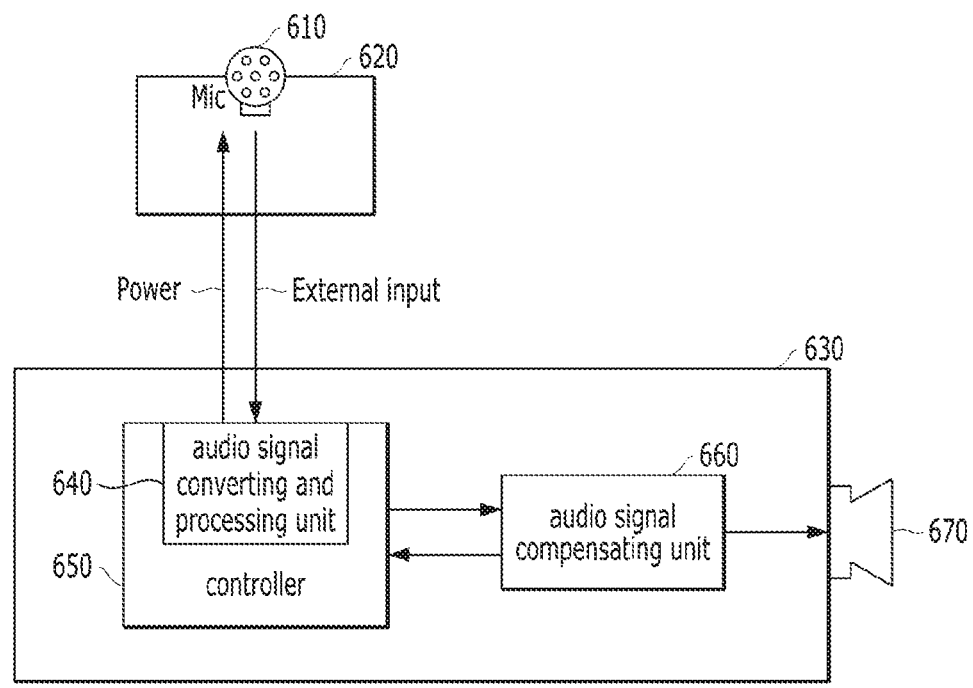

According to another embodiment, as shown in FIG. 6, an external module 620 may include a sound receiving unit 610 only.

Hence, the external module 620 may receive an external test sound through the sound receiving unit 610 (e.g., microphone, etc.), convert the test and then send an analog signal of the test sound to a controller 650 of a multimedia device 630.

Herein, the controller 650 of the multimedia device 630 may receive a test sound, which is an analog signal, converts the test sound into a digital signal from the analog signal through an audio signal converting and processing unit 640 for converting an analog signal into a digital signal from an analog signal, and then signal-process the test sound converted into the digital signal.

The controller 650 of the multimedia device 630 may calculate a compensation value of the test sound and then correct an audio signal to output according to the compensation value through the audio signal compensating unit 660.

And, an audio output unit 670 of the multimedia device 630 may output the corrected audio signal.

Figure 7:
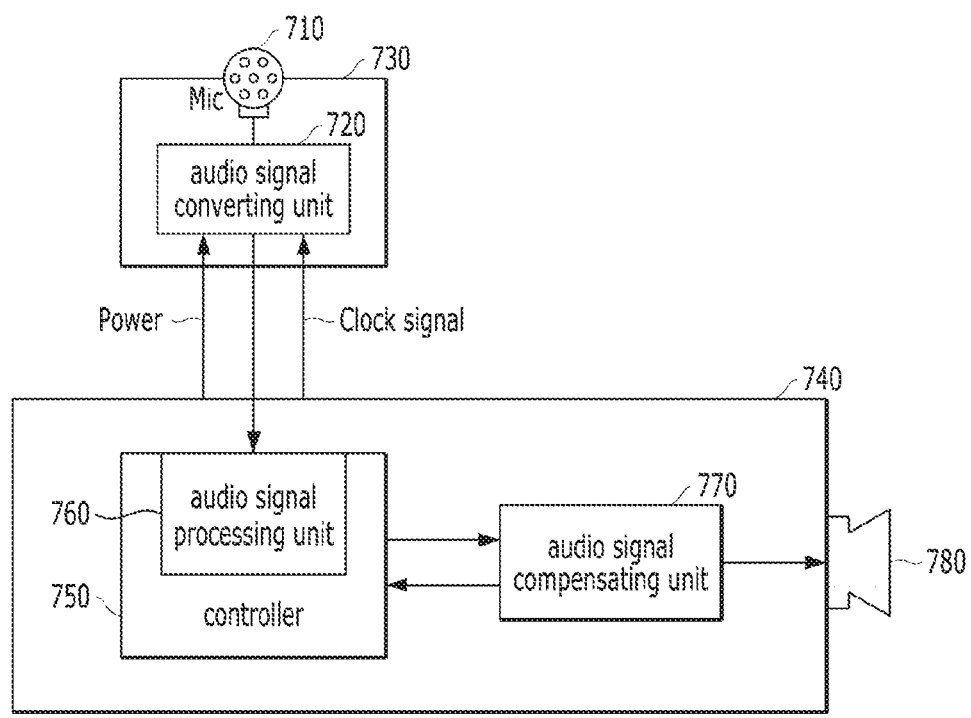

According to another embodiment, as shown in FIG. 7, an external module 730 may include a sound receiving unit 710 and an audio signal converting unit 720 for converting an analog signal into a digital signal.

Hence, the external module 730 may receive an external test sound through the sound receiving unit 710 (e.g., microphone, etc.), convert the test sound into a digital signal from an analog signal through an audio signal converting unit 720, and then send the test sound to a controller 750 of a multimedia device 740.

Herein, the controller 750 of the multimedia device 740 may signal-process the test sound converted into the digital signal through an audio signal processing unit 760.

The controller 750 of the multimedia device 740 may calculate a compensation value of the test sound and then correct an audio signal to output according to the compensation value through the audio signal compensating unit 760.

And, an audio output unit 780 of the multimedia device 740 may output the corrected audio signal.

Figure 8:
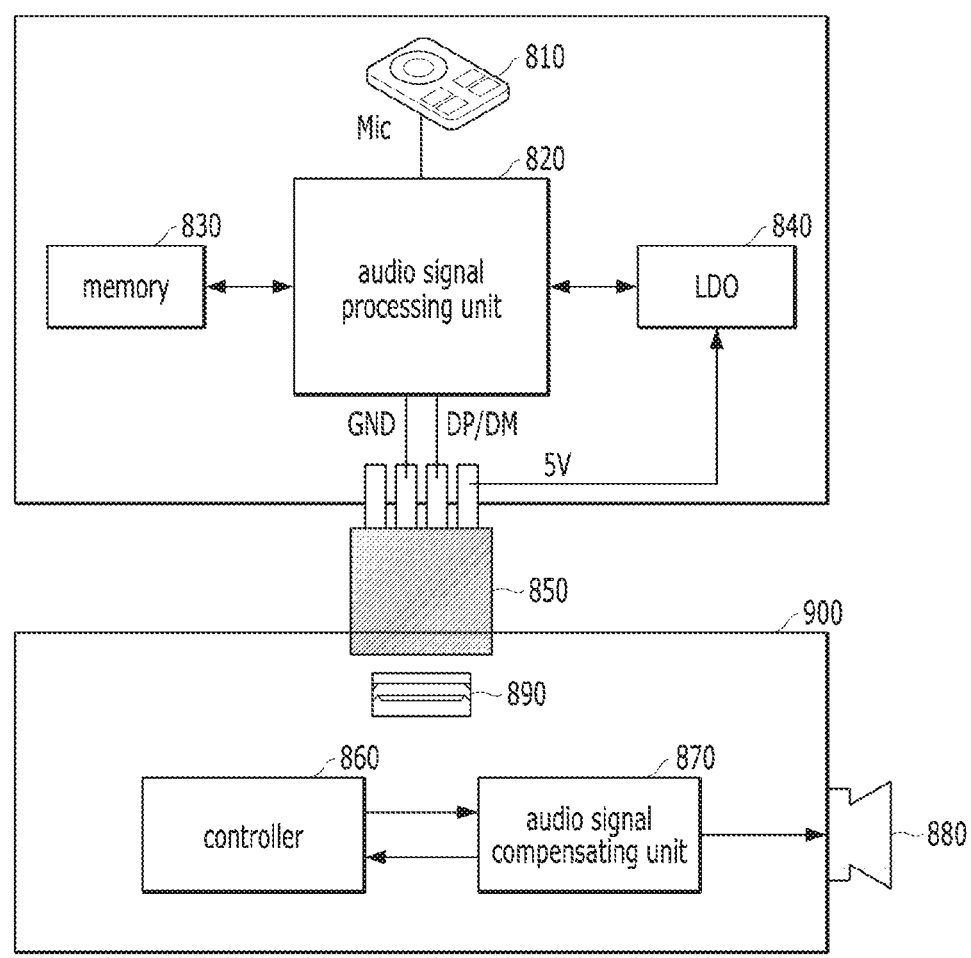

According to another embodiment, as shown in FIG. 8, an external module 800 may include a sound receiving unit 810, an audio signal processing unit 820, a memory 830, a voltage adjusting unit 840, and a USB interface unit 850.

The external module 540 may include an external type peripheral device having a USB interface supportive of a universal serial bus or a Bluetooth function. For instance, the external module 540 may have a USB dongle type.

Herein, if the USB interface unit 850 includes 4 pins, a first pin is provided for ground, second and third pins are provided for data transmission, and a fourth pin is provided for power input, for example.

For instance, the second and third pins are connected to the audio signal processing unit 820, and the fourth pin is connected to the voltage adjusting unit 840.

Hence, the external module 800 may receive an external test sound through the sound receiving unit 810 such as a microphone or the like, signal-process the test sound through the audio signal processing unit 820, and send the signal to a controller 860 of a multimedia device 900.

In doing so, the USB interface unit 850 of the external module 800 may be connected to a USB interface unit 890 of the multimedia device 900.

Hence, the controller 860 of the multimedia device 900 may receive the signal-processed test sound, calculate a compensation value of the test sound, and correct an audio signal to output according to the compensation value through the audio signal compensating unit 870.

And, an audio output unit 880 of the multimedia device 900 outputs the corrected audio signal.

Figure 9:
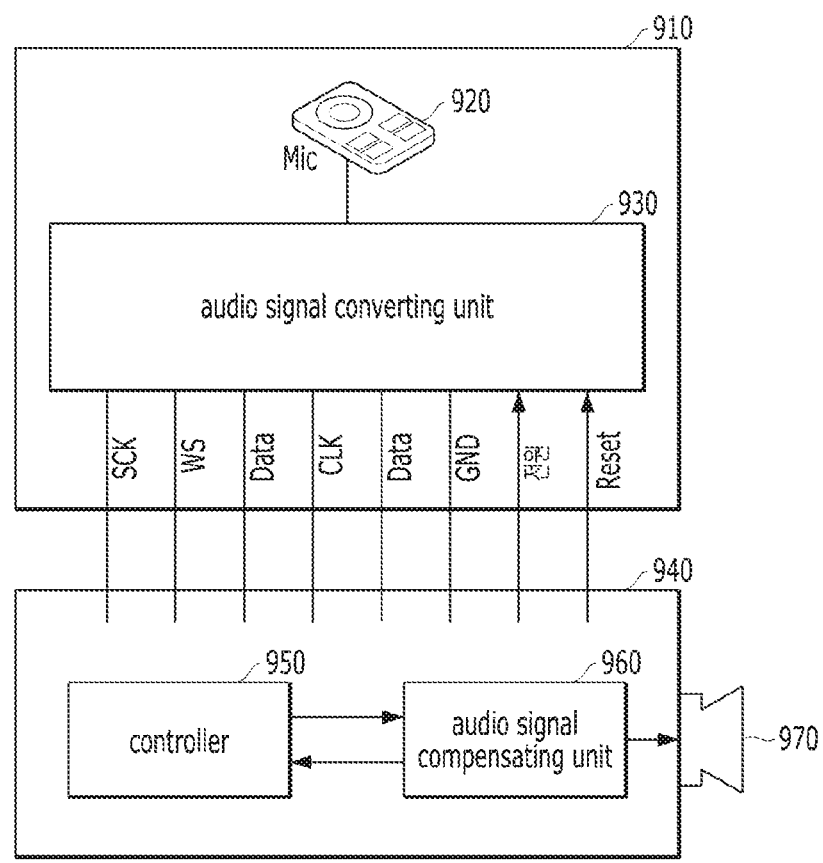

According to another embodiment, as shown in FIG. 9, an external module 910 may include a sound receiving unit 810 and an audio signal converting unit 930 configured to convert an analog signal into a digital signal.

Hence, the external module 910 may receive an external test sound through the sound receiving unit 920 such as a microphone or the like, convert the test sound into a digital signal from an analog signal, and send the test sound to a controller 950 of a multimedia device 940.

In doing so, the audio signal converting unit 930 of the external module 910 can interface per platform when connected to a mainboard of the multimedia device 940.

And, the controller 950 of the multimedia device 940 may signal-process the test sound converted into the digital signal through the audio signal processing unit 960.

Subsequently, the controller 950 of the multimedia device 940 may calculate a compensation value of the test sound and correct an audio signal to output according to the compensation value through the audio signal compensating unit 960.

And, an audio output unit 970 of the multimedia device 940 outputs the corrected audio signal.

Figure 10:
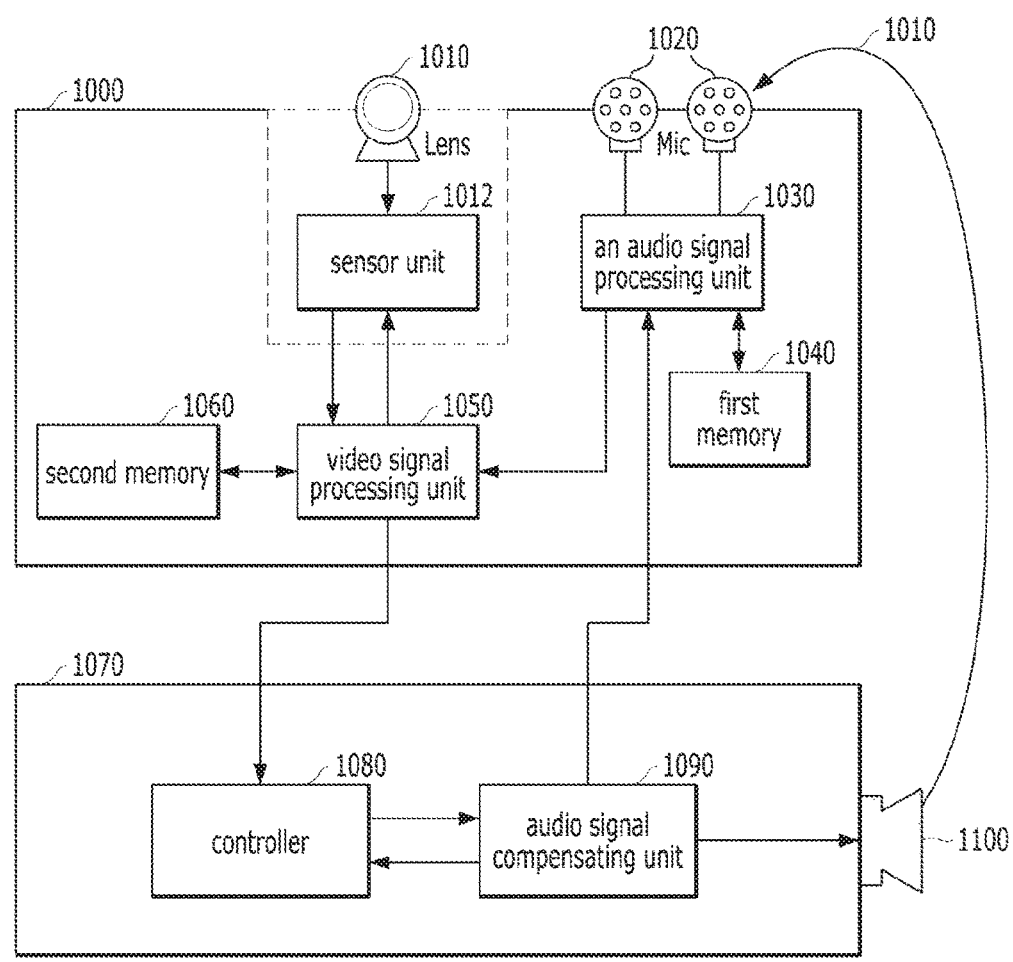

According to another embodiment, as shown in FIG. 10, an external module 1000 may include a camera lens unit 1010, a sensor unit 1012, a sound receiving unit 1020, an audio signal processing unit 1030, a first memory 1040, a video signal processing unit 1050, and a second memory 1060.

Herein, the external module 1000 is a camera module. The sound receiving unit 1020 may receive a test sound 1110 outputted from an audio output unit 1100 of a multimedia device 1070, an external noise, or a sound of a currently displayed video.

The video signal processing unit 1050 of the external module 1000 may set a test sound signal processed by the audio signal processing unit 1030 to a controller 1080 of the multimedia device 1070.

Hence, the controller 1080 of the multimedia device 1070 may receive the signal-processed test sound calculate a compensation value of the test sound, and correct an audio signal to output according to the compensation value.

And, the audio output unit 1100 of the multimedia device 1070 outputs the corrected audio signal.

Meanwhile, although a multimedia device receives an external test sound through a sound receiving unit of an external module, the sound receiving unit may be directly disposed within the multimedia device.

In this case, the sound receiving unit installed inside the multimedia device may be disposed in a manner of being spaced apart from an audio output unit of the multimedia device in a predetermined distance.

The reason for this is to prevent an audio signal outputted from the audio output unit from being directly inputted to the sound receiving unit.

If an audio signal outputted from the audio output unit is directly inputted to the sound receiving unit, it is unable to exactly know a disposed state of the multimedia device in an external environment, a noise state of the external environment and the like.

Thus, the above-configured multimedia device can receive an external test sound through the sound receiving unit and analyze frequency characteristic of the received test sound.

Herein, the test sound is a sound outputted from the audio output unit of the multimedia device to predict an external sound environment.

Herein, the test sound may include a preset white noise signal or a preset sweep signal, in order to predict the external sound environment.

Alternatively, the test sound may include a sound signal of a currently displayed video.

Alternatively, the test sound may include noise in an ambient environment.

Subsequently, the multimedia device may calculate a compensation value of the test sound according to the analyzed frequency characteristic of the test sound, correct an audio signal to output according to the calculated compensation value, and output the corrected audio signal.

Figure 11:
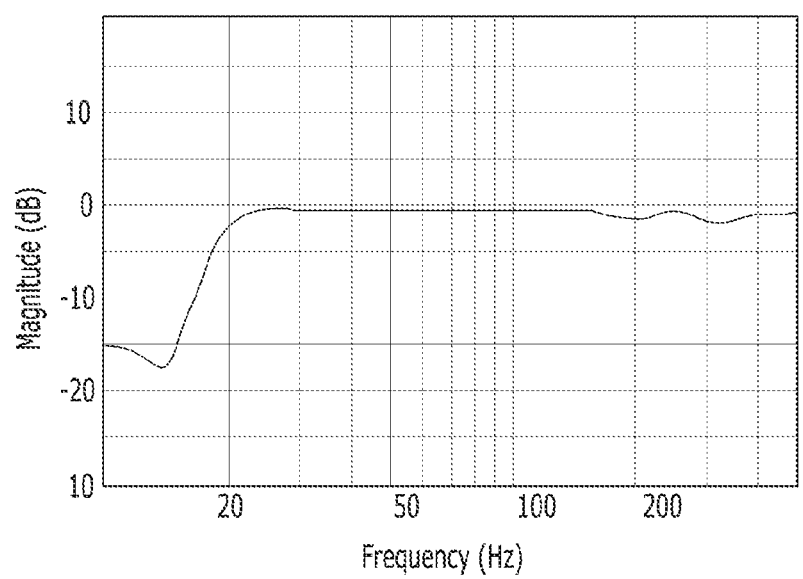
FIG. 11 is a graph of analysis of frequency characteristic of test sound.
Figure 12:
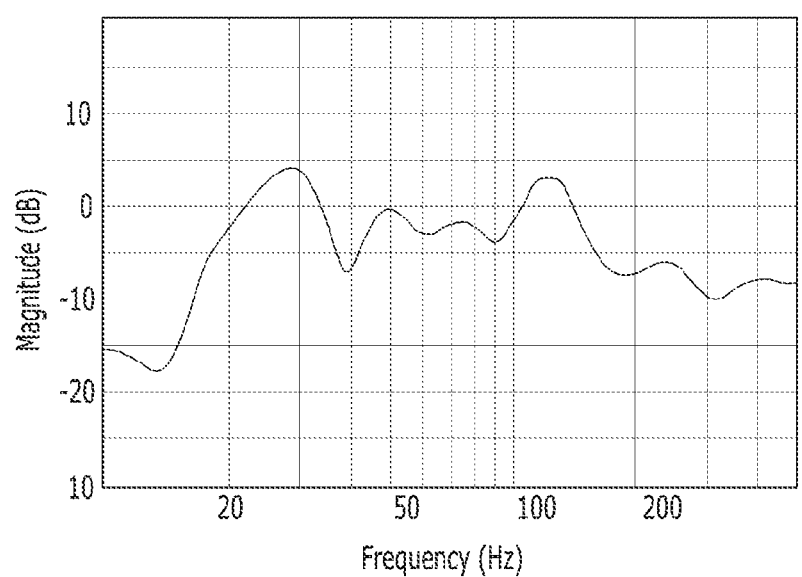
FIG. 12 is a graph of analysis of frequency characteristic of a corrected audio signal.

FIG. 11 is a graph of analysis of frequency characteristic of test sound, and FIG. 12 is a graph of analysis of frequency characteristic of a corrected audio signal.

A multimedia device may receive an external test sound through a sound receiving unit and analyze frequency characteristic of the received test sound.

Particularly, referring to FIG. 11, regarding frequency characteristic of a test sound, frequencies on lower, middle and upper ranges may appear irregularly according to an ambient environment, respectively.

For instance, the frequency characteristic of the test sound may have deviation of about 5~8 dB according to various ambient environments.

Subsequently, the multimedia device may calculate a compensation value of the test sound according to the analyzed frequency characteristic of the test sound, correct an audio signal to output according to the calculated compensation value, and output the corrected audio signal.

Herein, referring to FIG. 12, regarding the frequency characteristic of the corrected audio signal, frequencies on lower, middle and upper ranges may appear regularly.

Therefore, the present invention calculates a compensation value by analyzing frequency characteristic of a received test sound, corrects an audio signal with the calculated compensation value, and then outputs the corrected audio signal, thereby providing sound of an optimal value according to a multimedia device installed place and various ambient environments.

And, the present invention always outputs an optimal sound in various environments, thereby providing user convenience without limitations put on installation environments as well as providing a user with a satisfiable sound quality service.

Figure 13:
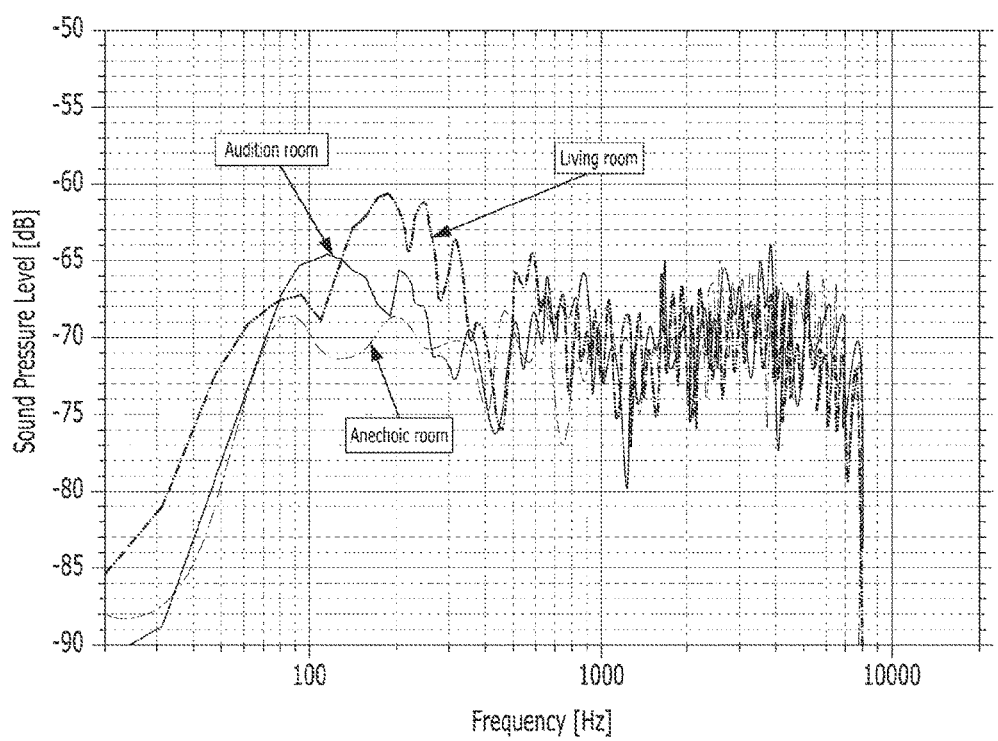
FIG. 13 is a graph showing sound distortion effect according to external environment.

FIG. 13 is a graph showing sound distortion effect according to external environment.

Referring to FIG. 13, if a multimedia device outputs the same sound, frequency characteristic of each received sound may be different according to a multimedia device located environment.

For instance, if a multimedia device is disposed in an anechoic room, a lowest frequency of sound appears in a lower range particularly. If a multimedia device is disposed in an audition room, a middle frequency of sound appears in a lower range. If a multimedia device is disposed in a living room, a highest frequency may appear in a lower range.

Generally, a multimedia device can be developed into an optimal state through sound frequency characteristic measurement and listening evaluation in a development environment. Yet, in a manufacturing process, an error amounting to about 2 dB may occur due to mass production deviation.

Moreover, depending on various multimedia device installed environments, a severe deviation of about 5~8 dB may appear.

Therefore, the present invention calculates a compensation value by analyzing frequency characteristic of a received test sound, corrects an audio signal with the calculated compensation value, and then outputs the corresponding signal, thereby providing sound of an optimal value according to a multimedia device installed place and various ambient environments.

Figure 14:
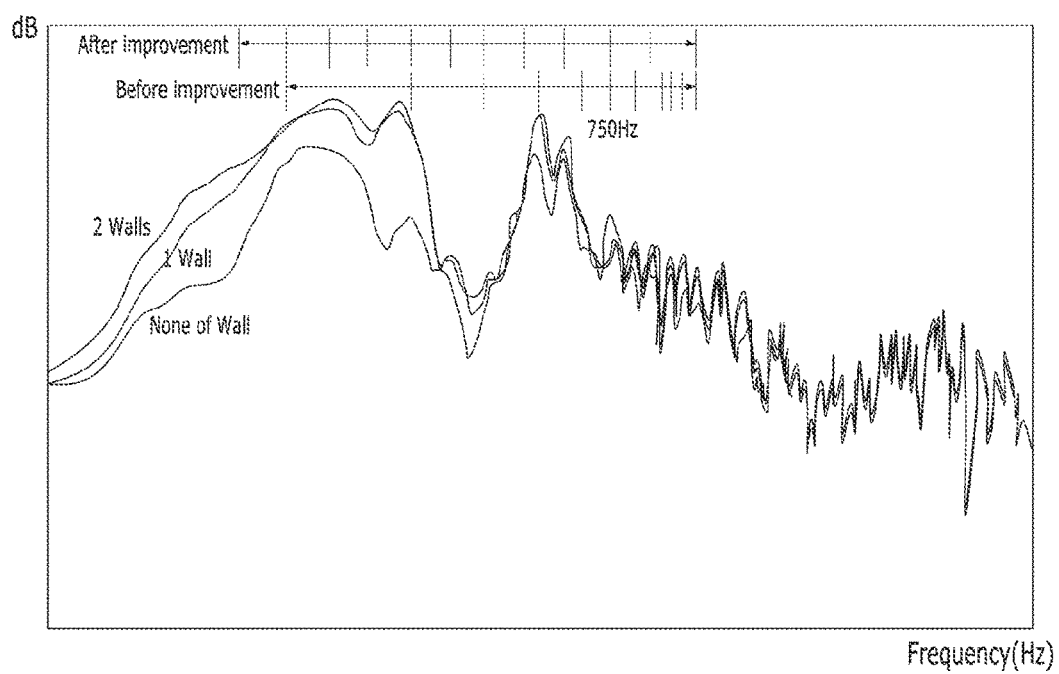
FIG. 14 is a graph showing correction of sounds measured in various environments.

FIG. 14 is a graph showing correction of sounds measured in various environments.

Referring to FIG. 14, if there is no wall in a multimedia device installed place, a first frequency characteristic appears. If there is one wall in a multimedia device installed place, a second frequency characteristic appears. If there are two walls in a multimedia device installed place, a third frequency characteristic appears.

Herein, the first to third frequency characteristics have big deviations in a low range particularly. And, it is able to calculate a compensation value in a manner of measuring a deviation extent between each frequency characteristic and an original frequency characteristic.

For instance, a multimedia device can calculate a compensation value to reconstruct an original frequency characteristic as far as possible by raising resolution of a peak-up frequency range (high level frequency range in very short period).

For instance, if resolution of frequency is currently about 10 bands, it is raised to about 255 bands. If a frequency band is currently about 125 Hz~1.2 kHz, it can be lowered to about 50 Hz~8 kHz finely.

Herein, a real compensation frequency band may be about 50 Hz~1.2 kHz.

Thus, depending on disposed directions of a multimedia device and its speakers or an environment of a user's audition room, due to a boost increase of a low-pitched sound band, articulation of sound may be further degraded.

Therefore, the present invention can provide optimal sound through audio signal compensation to fit an audition room environment.

Figure 15:
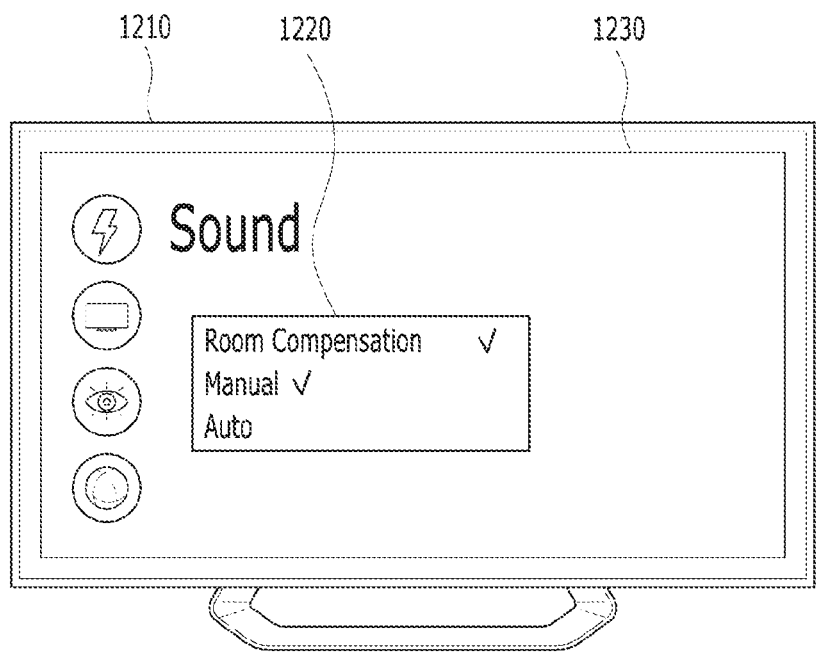
FIG. 15 is a diagram showing a manual/auto adjustment selection window for sound compensation of the present invention.

FIG. 15 is a diagram showing a manual/auto adjustment selection window for sound compensation of the present invention.

Referring to FIG. 15, a multimedia device according to the present invention checks whether a sound compensation request signal is received from a user. If the sound compensation request signal is received, the multimedia device may create a manual/audio adjustment selection window 1220 for sound compensation and then display it on a display 1210.

In doing so, the manual/auto adjustment selection window 1220 may display selection items 1230 for compensating a sound environment manually or automatically.

Hence, the user can set up manual adjustment or auto adjustment for the sound compensation of the multimedia device using a remote controller or the like.

Herein, if the user sets the manual adjustment, the multimedia device outputs a test sound through a sound output unit, analyzes frequency characteristic of the test sound by receiving the outputted sound again, displays a compensation value manual adjustment window to enable the user to adjust a compensation value of the sound manually in direct, and is then able to correct an audio signal according to the compensation value set by the user.

Yet, if the user sets the audio adjustment, the multimedia device outputs a test sound through a sound output unit, analyzes frequency characteristic of the test sound by receiving the outputted sound again, calculates a compensation value, and is then able to automatically correct an audio signal according to the calculated compensation value.

Herein, the multimedia device set for the auto adjustment can periodically perform the operation of calculating a compensation value by receiving a fed-back test sound and then correcting an audio signal automatically.

Figure 16:
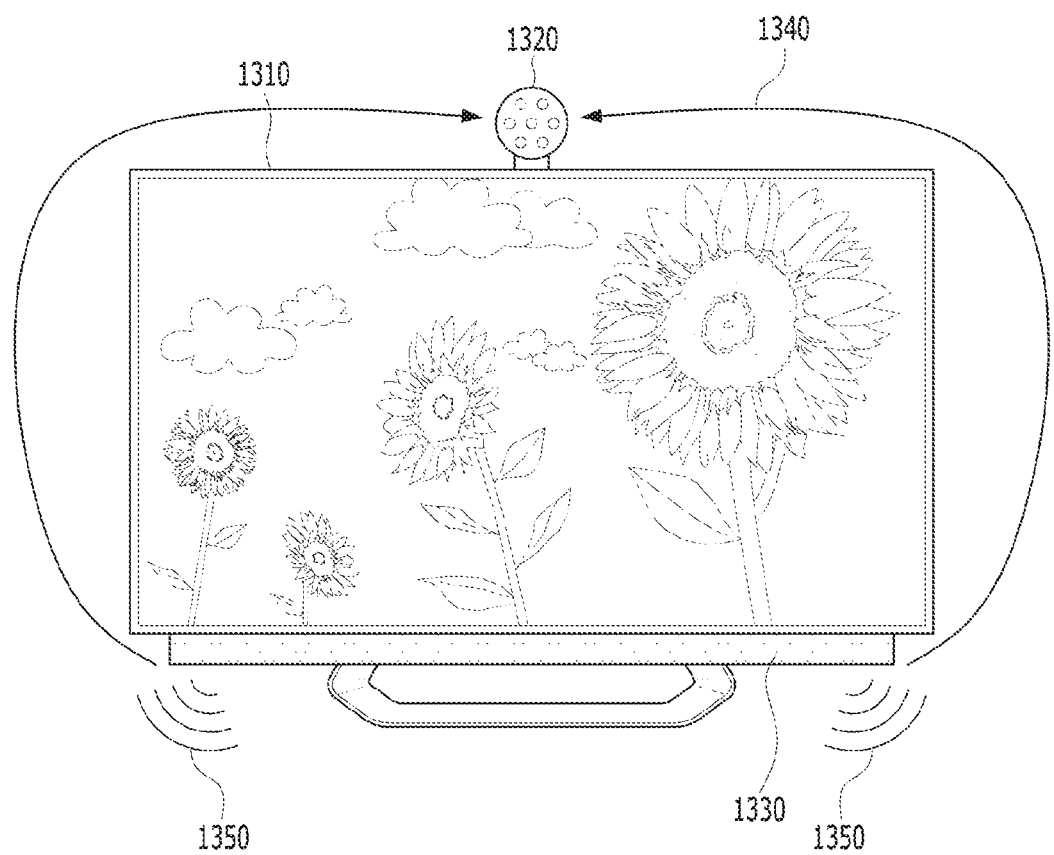
FIG. 16 is a diagram showing a test sound output of a multimedia device according to manual adjustment setting.
Figure 17:
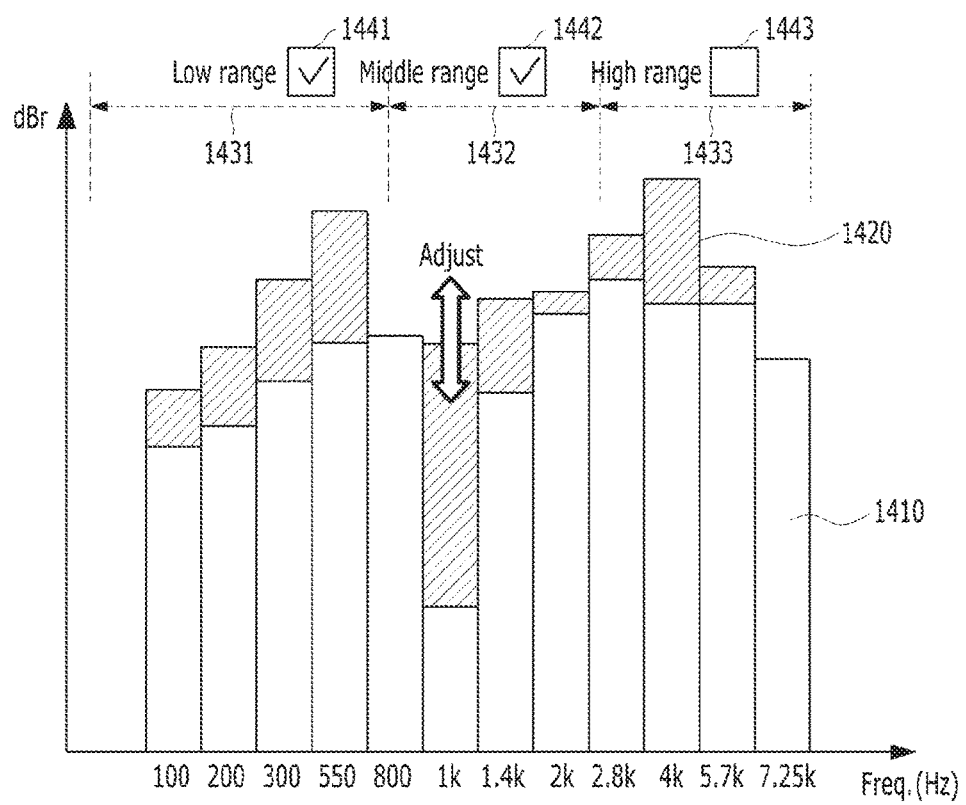
FIG. 17 is a diagram showing a compensation value manual adjustment window according to manual adjustment setting.
Figure 18:
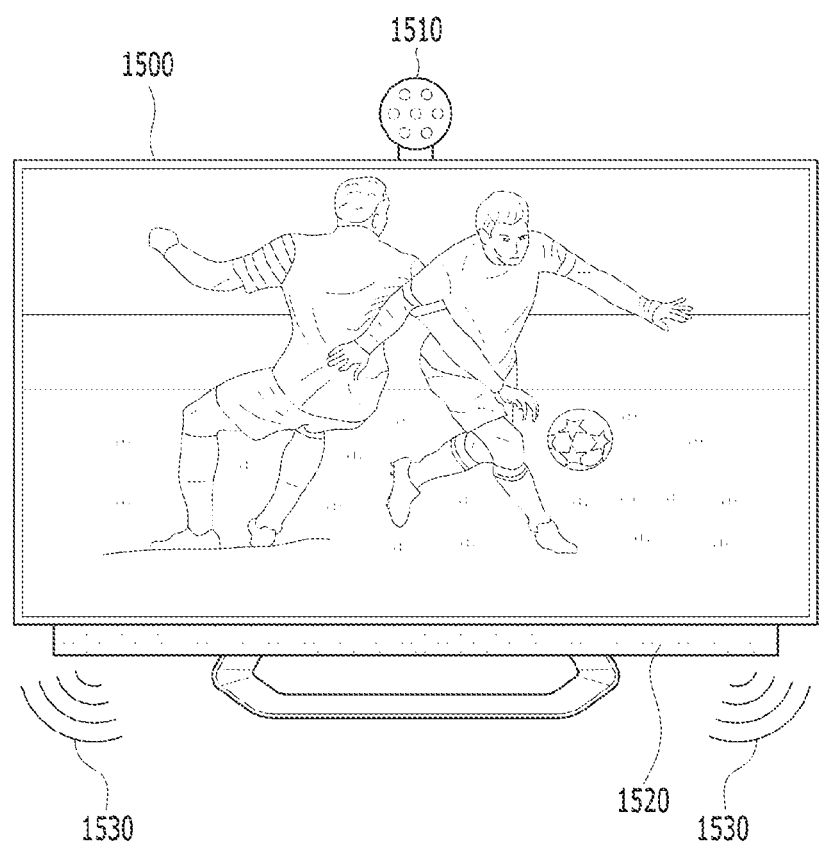
FIG. 18 is a diagram showing a test sound output of a multimedia device according to auto adjustment setting.

FIG. 16 is a diagram showing a test sound output of a multimedia device according to manual adjustment setting. FIG. 17 is a diagram showing a compensation value manual adjustment window according to manual adjustment setting. FIG. 18 is a diagram showing a test sound output of a multimedia device according to auto adjustment setting.

Referring to FIG. 16, if a user sets a sound compensation setting to auto adjustment, a multimedia device 1310 outputs a test sound 1340 through a sound output unit 1330 and is able to receive the outputted test sound 1340 through a sound receiving unit 1320.

Herein, the outputted test sound may include at least one of a preset white noise signal, a preset sweep signal, and a sound signal of a currently displayed video.

The multimedia device 1310 may interpret a room environment, in which the multimedia device is currently located, by analyzing frequency characteristic of the received test sound and calculate a compensation value of the test sound according to the analyzed frequency characteristic.

Subsequently, referring to FIG. 17, the multimedia device 1310 may display a compensation value manual adjustment window on the display to enable a user to manually adjust a compensation value of sound in direct.

Herein, the compensation value manual adjustment window may include a frequency characteristic 1410 of a test sound. The frequency characteristic 1410 of the test sound may represent a frequency strength of each frequency as a prescribed shape such as a bar type.

In some cases, the compensation value manual adjustment window may further include a recommended compensation value 1420 corresponding to each frequency in the frequency characteristic 1410 of the test sound.

Herein, like the frequency characteristic 1410 of the test sound, the recommended compensation value 1420 may be represented as a prescribed shape such as a bar type to correspond to each frequency of the test sound.

If both of the frequency characteristic 1410 of the test sound and the recommended compensation value 1420 are displayed on the compensation value manual adjustment window together, a user can adjust the recommended compensation value 1420 corresponding to each frequency of the test sound only. Since the frequency characteristic 1410 of the test sound is fixed, it is not adjustable.

In some cases, when both of the frequency characteristic 1410 of the test sound and the recommended compensation value 1420 are displayed on the compensation value manual adjustment window together, a user can adjust the recommended compensation value 1420 corresponding to each frequency of the test sound only or the frequency characteristic 1410 of the test sound.

In some cases, when the frequency characteristic 1410 of the test sound is displayed on the compensation value manual adjustment window only, a user can adjust the frequency characteristic 1410 of the test sound.

Herein, when the frequency characteristic 1410 of the test sound is compensated, the user can adjust a compensation value by making a selection per frequency of the test sound.

In doing so, the user may adjust a compensation value in a manner of selecting and raising/lowering a bar shape of each frequency of the test sound.

In some cases, when the frequency characteristic 410 of the test sound is compensated, the user may adjust a compensation value in a manner of making a primary selection per frequency band of the test sound and then making a secondary selection per frequency of the primarily selected frequency band.

Herein, if the user adjusts the compensation value by selecting a specific frequency from frequencies of the primarily selected frequency band, the rest of the frequencies of the primarily selected frequency band can be simultaneously compensated for compensation values.

For instance, if a frequency band of a test sound is divided into a low range 1431, a middle range 1432 and a high range 1433, a selection box can be displayed per range.

Namely, a low range selection box 1441 is displayed on the low range 1431, a middle range selection box 1442 is displayed on the middle range 1432, and a high range selection box 1443 is displayed on the high range 1433.

Herein, by selecting the low range selection box 1441 and the middle range selection box 1442 from a multitude of the selection boxes, the user can make the primary selection per frequency band of the test sound.

Subsequently, by selecting a specific frequency of 1 kHz from the primarily selected middle range 1432 and then adjusting a compensation value, the user can make the secondary selection per frequency of the primarily selected frequency band.

In some cases, if the user selects a specific frequency of 1 kHz from the primarily selected middle range 1432 and then adjusts a compensation value, the rest of 1.4 kHz and 2 kHz of the primarily selected middle range 1432 can be simultaneously compensated for compensation values according to an adjustment rate.

The compensation value manual adjustment window may include the recommended compensation value 1420 corresponding to each frequency of the test sound. And, the recommended compensation value 1420 may be displayed in a prescribed shape such as a bar type to correspond to each frequency of the test sound.

The recommended compensation value 1420 may be adjusted by a user's selection. If a user adjusts a prescribed one of the recommended compensation values 1420 of the respective frequencies, the corresponding recommended compensation value 1420 is adjusted only but the rest of the recommended compensation values 1420 may be maintained.

For instance, if a user adjusts a recommended compensation value 1420 of 1 kHz frequency in the middle range 1432, the recommended compensation values 1420 of the rest of the frequencies may be maintained intact without adjustment.

Alternatively, if a user adjusts a prescribed one of the recommended compensation values 1420 of the respective frequencies, the rest of the recommended compensation values 1420 may be simultaneously adjusted.

For instance, if a user adjusts a recommended compensation value 1420 of 1 kHz frequency in the middle range 1432, the recommended compensation values 1420 of the rest of the frequencies may be simultaneously adjusted according to the adjustment rate.

Alternatively, when the recommended compensation value 1420 is adjusted, a user can adjust the recommended compensation value in a manner of making a primary selection per frequency band of the test sound and then making a secondary selection per recommended compensation value of each frequency of the primarily selected frequency band.

Herein, if a user selects the recommended compensation value 1420 of a specific frequency from frequencies of the primarily selected frequency band and then adjusts it, the recommended compensation values 1420 of the rest of the frequencies of the primarily selected frequency band can be simultaneously adjusted according to an adjustment rate.

For instance, if a frequency band of a test sound is divided into a low range 1431, a middle range 1432 and a high range 1433, a selection box can be displayed per range.

Namely, a low range selection box 1441 is displayed on the low range 1431, a middle range selection box 1442 is displayed on the middle range 1432, and a high range selection box 1443 is displayed on the high range 1433.

Herein, by selecting the low range selection box 1441 and the middle range selection box 1442 from a multitude of the selection boxes, the user can make the primary selection per frequency band of the test sound.

Subsequently, by selecting a recommended compensation value 1420 of a specific frequency of 1 kHz from the primarily selected middle range 1432 and then adjusting a compensation value, the user can make the secondary selection per recommended compensation value of each frequency of the primarily selected frequency band.

In some cases, if the user selects a recommended compensation value 1420 of a specific frequency of 1 kHz from the primarily selected middle range 1432 and then adjusts a compensation value, the rest of the recommended compensation values 1420 of 1.4 kHz and 2 kHz of the primarily selected middle range 1432 can be simultaneously compensated for compensation values according to an adjustment rate.

Referring to FIG. 18, if a user sets a sound compensation setting to manual adjustment, a multimedia device 1500 outputs a test sound 1530 through a sound output unit 1520 and is able to receive the outputted test sound 1530 through a sound receiving unit 1510.

Herein, the outputted test sound may include at least one of a preset white noise signal, a preset sweep signal, and a sound signal of a currently displayed video.

The multimedia device 1500 may interpret a room environment, in which the multimedia device is currently located, by analyzing frequency characteristic of the received test sound and calculate a compensation value of the test sound according to the analyzed frequency characteristic.

Subsequently, the multimedia device 1500 corrects an audio signal to output according to the calculated compensation value and then outputs the corrected audio signal.

Thereafter, the multimedia device 1500 measures a next reception time of the test sound 1530 and then checks whether a preset reception time expires. If the reception time expires, the multimedia device 1500 receives a currently outputted test sound 1530 and then repeats a process for calculating a compensation value and then correcting an audio signal.

Namely, the multimedia device 1500 can automatically perform a process for receiving a text sound periodically in each preset predetermined time interval, calculating a compensation value, and correcting an audio signal.

Figure 19:
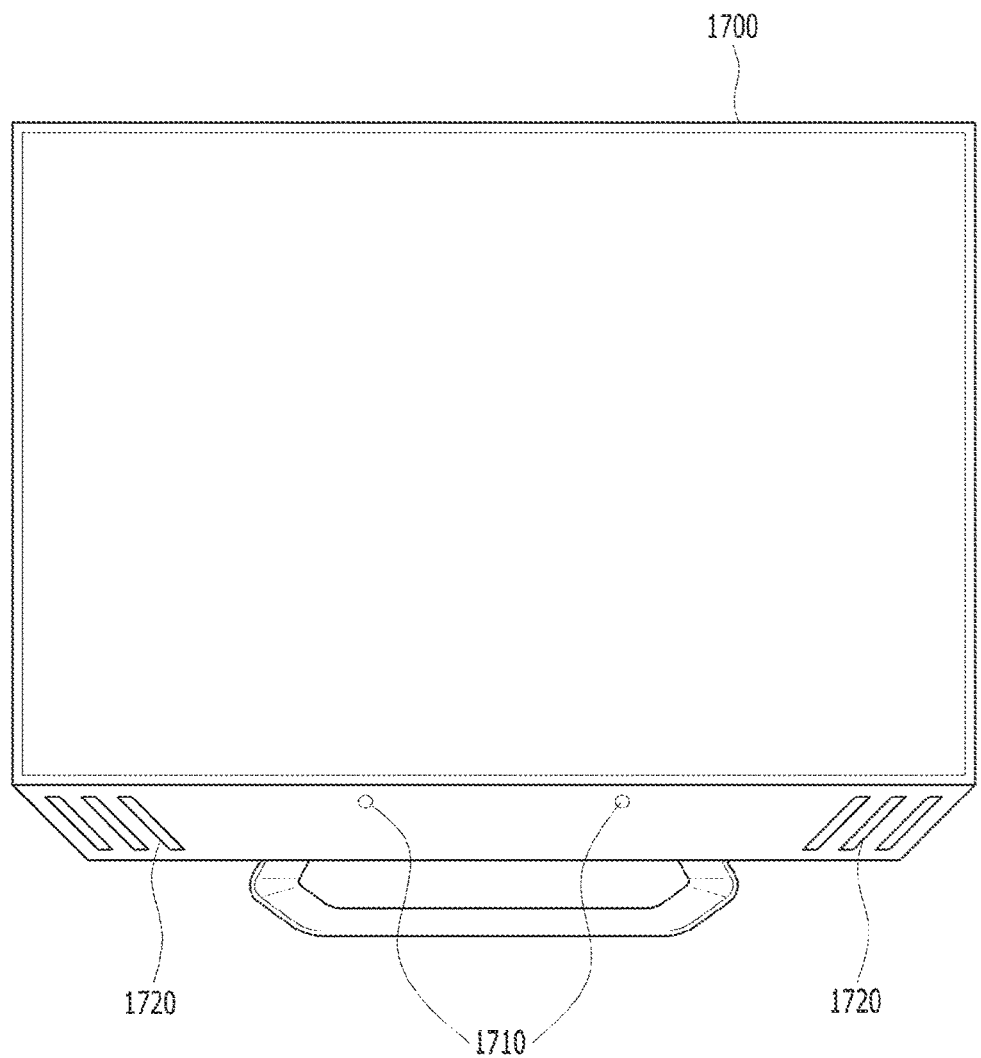
FIG. 19 is a diagram showing locations of a sound receiving unit and a sound output unit.
Figure 20:
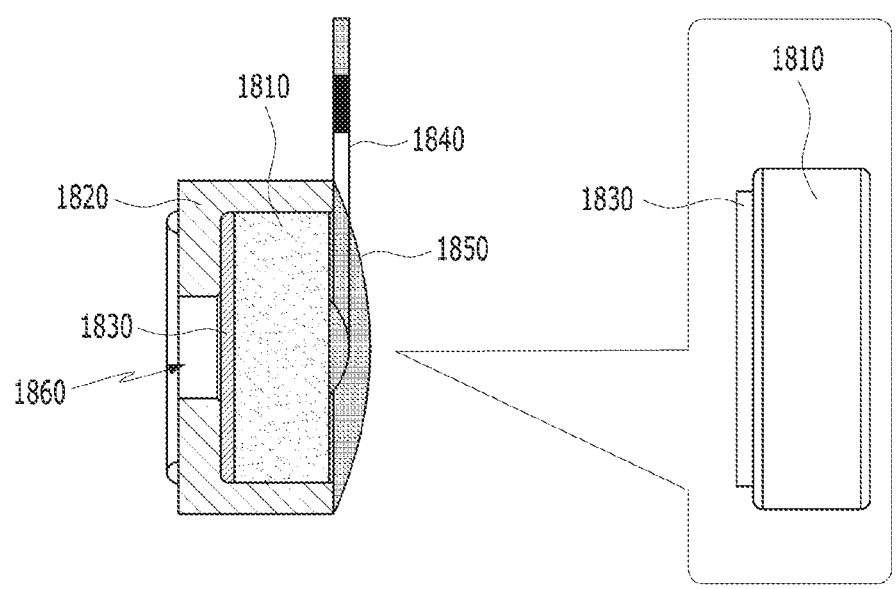
FIG. 20 and FIG. 21 are cross-sectional diagrams showing a disposed structure of a microphone of a sound receiving unit.
Figure 21:
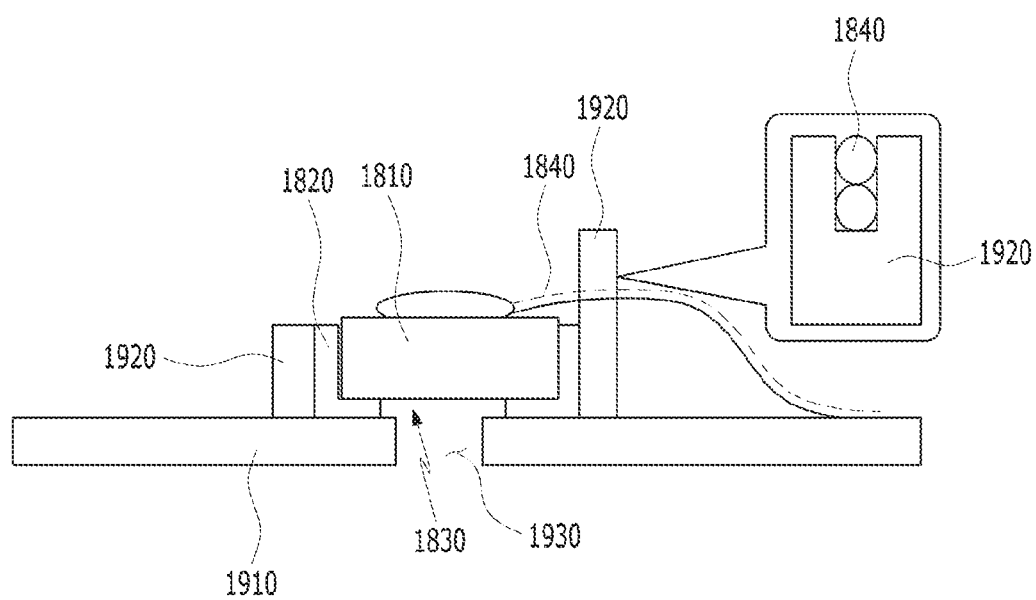

FIG. 19 is a diagram showing locations of a sound receiving unit and a sound output unit. FIG. 20 and FIG. 21 are cross-sectional diagrams showing a disposed structure of a microphone of a sound receiving unit.

Referring to FIG. 19, a sound receiving unit and a sound output unit may be disposed on a bottom part of a multimedia device 1700.

Hence, a first hole 1710 for the sound receiving unit to receive an external sound may be formed in the bottom part of the multimedia device 1700.

Herein, the first hole 1710 is disposed to correspond to the sound receiving unit. For instance, if a multitude of the sound receiving units exist, the first hole 1710 can be disposed in one-to-one correspondence with each of the sound receiving units.

A second hole 1720 for the sound output unit to output sound may be formed in the bottom part of the multimedia device 1700.

Herein, the second hole 1720 may be disposed in correspondence with each sound output unit.

Alternatively, the sound receiving unit and the sound output unit may be disposed in a top or lateral part of the multimedia device 1700.

Thus, the sound receiving unit and the sound output unit may be disposed in at least one of the bottom, top and lateral parts of the multimedia device 1700. And, the sound receiving unit and the sound output unit may be disposed in the same location among the bottom, top and lateral parts of the multimedia device 1700 in a manner of being adjacent to each other.

Alternatively, the sound receiving unit and the sound output unit may be separately disposed in different locations selected from the bottom, top and lateral parts of the multimedia device.

For instance, the sound receiving unit is disposed in the bottom part of the multimedia device 1700 and the sound output unit is disposed in the lateral part of the multimedia device 1700.

Moreover, in case of performing an audio compensation operation, the multimedia device 1700 may have a single sound receiving unit disposed therein. In some cases, if performing a long-distance sound recognition operation, the multimedia device 1700 may have a multitude of sound receiving units disposed therein.

Herein, when a multitude of the sound receiving units are disposed, they are disposed in a manner of being uniformly spaced apart from each other. For instance, a space between the sound receiving units may include about 5~10 cm.

Referring to FIG. 20, the sound receiving unit may include a microphone 1810, a holder 1820 having the microphone 1810 installed therein, a buffer member disposed between the microphone 1810 and the holder 1820, a wire 1840 electrically connected to the microphone 1810, and a cover member 1850 covering the microphone 1810.

Herein, at least one holder hole 1860 for receiving an external sound may be formed in a bottom of the holder 1820. And, the holder 1820 may be formed of a rubber substance capable of electrical insulation and buffering.

Referring to FIG. 21, the sound receiving unit including the microphone 1810 and the holder 1820 may be mounted in a manner of being fixed to a fixing rib 1920 formed in a bottom cover 1910 of the multimedia device.

Herein, at least one microphone hole 1930 for receiving an external sound may be formed in the bottom cover 1910 having the sound receiving unit mounted thereon.

Particularly, the microphone hole 1930 may be formed to correspond to the holder hole 1860 formed in the bottom of the holder 1820 of the sound receiving unit. A diameter of the microphone 1930 may be smaller than that of the holder hole 1860.

The reason for the diameter of the microphone hole 1930 to be smaller than that of the holder hole 1860 is to enable an external sound to enter the microphone easily and smoothly.

The wire 1840 of the sound receiving unit may be connected to the multimedia device by passing through a perforated hole formed in the fixing rib 1920. If a multitude of the wires 1840 exist, they may be arranged by being stacked on each other in a vertical direction.

The reason for this is to minimize a size of the perforated hole perforated by the wires 1840.

Figure 22:
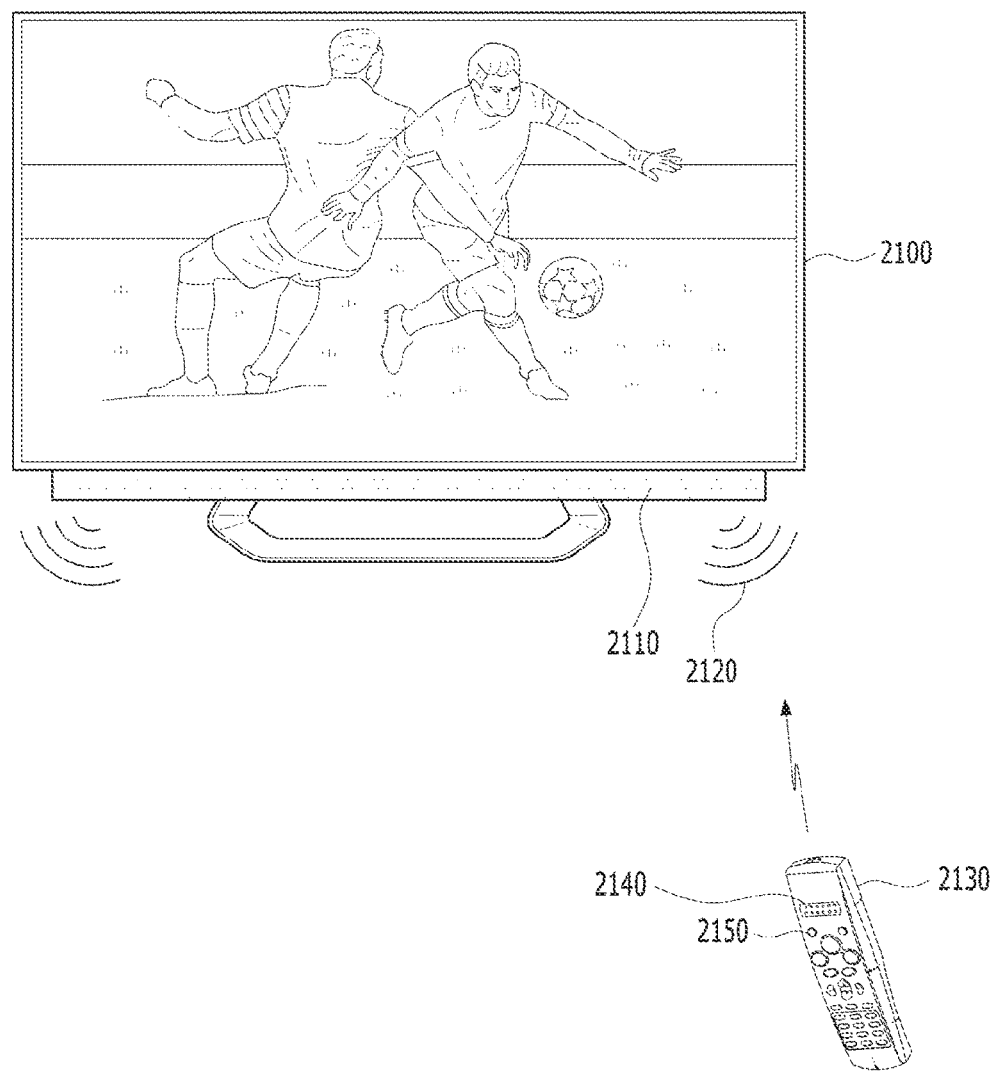
FIG. 22 is a diagram showing a remote controller in which a sound receiving unit for receiving test sound is installed.

FIG. 22 is a diagram showing a remote controller in which a sound receiving unit for receiving test sound is installed.

Referring to FIG. 22, a remote controller 2130 may include a sound receiving unit 2140 for receiving a test sound 2120, and a multimedia device 2100 may include a sound output unit 2110 for outputting the test sound 2120.

Namely, the remote controller 2130 receives the test sound 2120 through the sound receiving unit 2140 such as a microphone or the like and is able to send the received test sound to the multimedia device 2100.

Herein, the remote controller 2130 may further include a voice recognition button 2150 for driving the sound receiving unit 2140.

For instance, if the remote controller 2130 includes the sound receiving unit 2140 (e.g., microphone, etc.) only, the remote controller 2130 receives an external test sound 2120 through the sound receiving unit 2140 and sends an analog signal of the test sound to a controller of the multimedia device 2100.

Herein, the controller of the multimedia device 2100 receives the test sound of the analog signal, converts the test signal into a digital signal from the analog signal through an audio signal converting and processing unit for converting an analog signal into a digital signal and then signal-processing it, and is then able to signal-process the test sound converted into the digital signal.

Subsequently, the controller of the multimedia device 2100 calculates a compensation value of the test sound, corrects an audio signal to output according to the compensation value through an audio signal compensating unit, and then outputs the corrected audio signal.

For another instance, if the remote controller 2130 includes an audio signal processing unit and a memory as well as the sound receiving unit 2140, the remote controller 2130 receives an external test sound 2120 through the sound receiving unit 2140, signal-processes the received test sound through the audio signal processing unit, and sends the signal-processed test sound to a controller of the multimedia device 2100.

Herein, the controller of the multimedia device 2100 receives the signal-processed test sound, calculates a compensation value of the test sound, corrects an audio signal to output according to the compensation value through the audio signal compensating unit, and is then able to output the corrected audio signal.

For further instance, if the remote controller 2130 includes an audio signal converting unit for converting an analog signal into a digital signal as well as the sound receiving unit 2140, the remote controller 2130 receives an external test sound through the sound receiving unit 2140, converts the test sound into a digital signal from an analog signal, and sends the converted test sound to a controller of the multimedia device 2100.

Herein, the controller of the multimedia device 2100 signal-processes the test sound converted into the digital signal through the audio signal processing unit, calculates a compensation value of the test sound, corrects an audio signal to output according to the compensation value through an audio signal compensating unit, and then outputs the corrected audio signal.

FIGS. 23 to 26 are diagrams showing a process for receiving test sound using a remote controller having a sound receiving unit.

Figure 23:
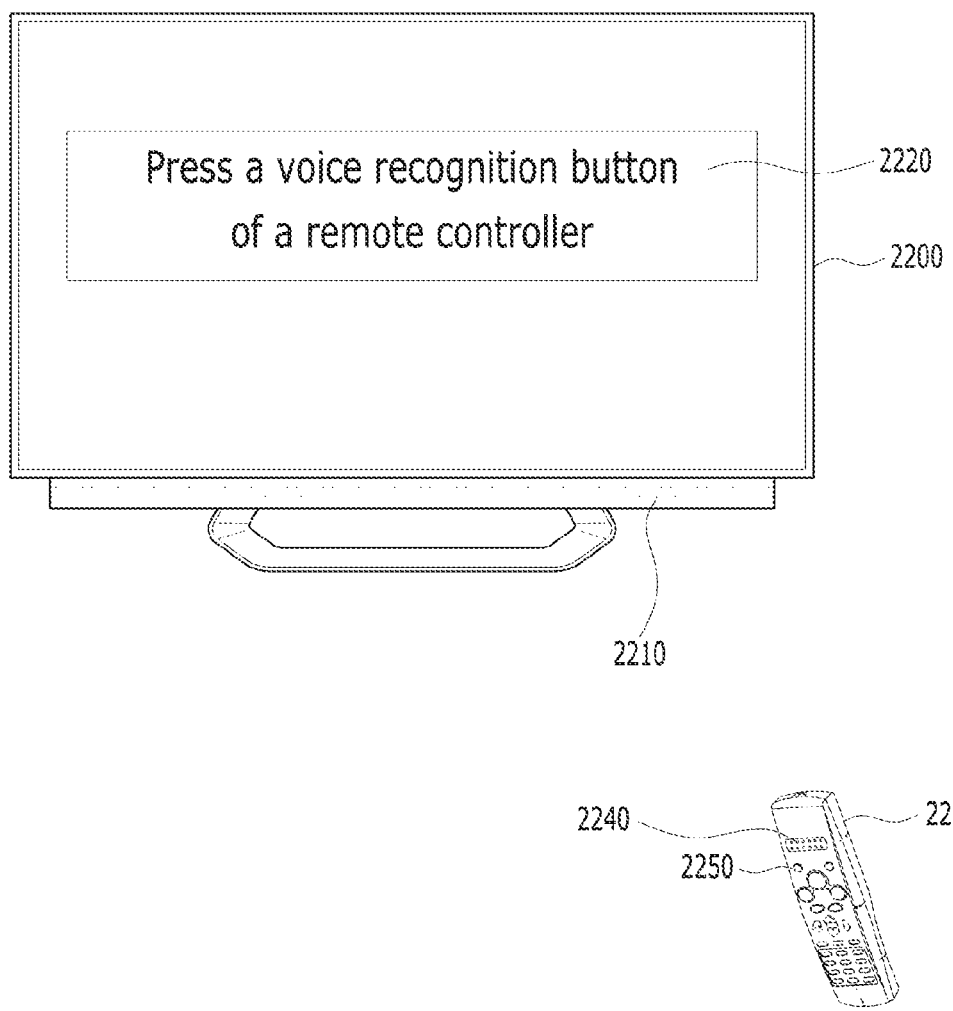
FIGS. 23 to 26 are diagrams showing a process for receiving test sound using a remote controller having a sound receiving unit.

Referring to FIG. 23, in response to a user's audio compensation request, a multimedia device 2200 may display a guide information window 2220, which describes a drive guide for a sound receiving unit 2240 of a remote controller 230, on a screen.

For instance, in response to a user's audio compensation request, the multimedia device 2200 can display a guide information window 2220, which indicates 'Press a voice recognition button of a remote controller', on the screen.

Figure 24:
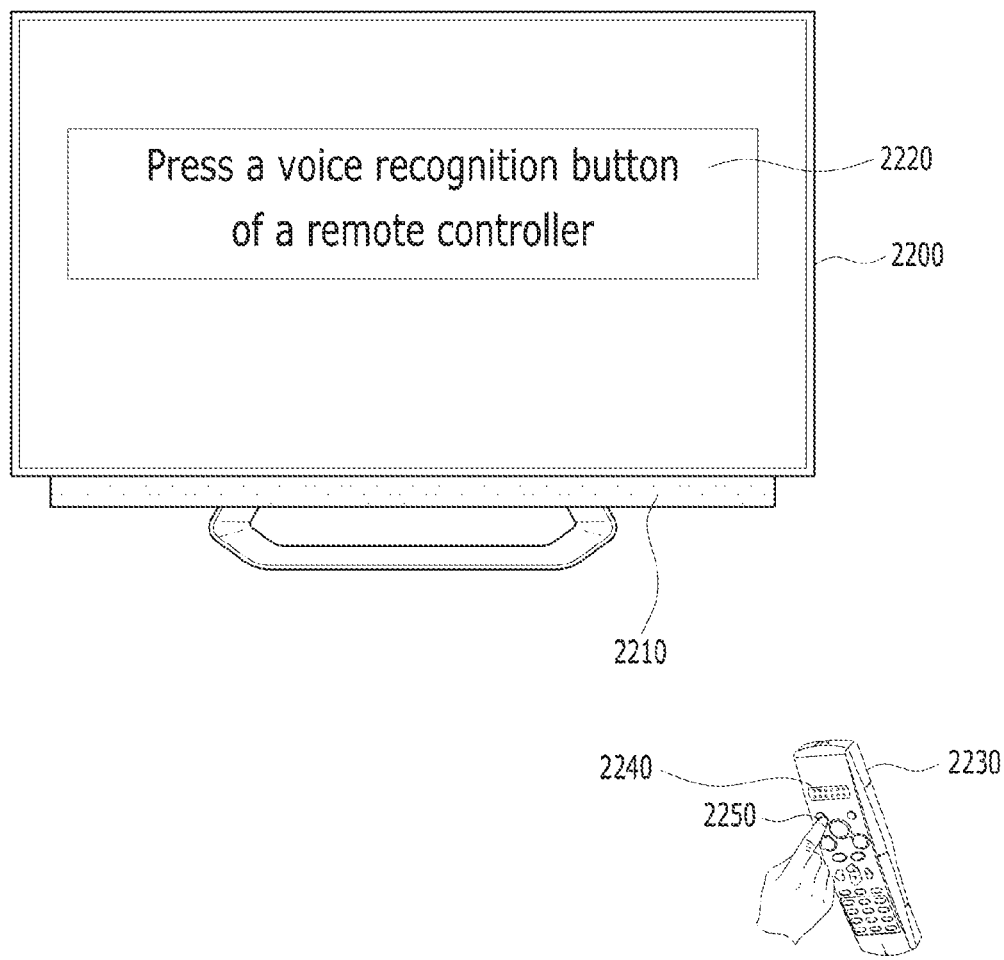

Referring to FIG. 24, the user can drive the sound receiving unit 2240 of the remote controller 2230 by pressing a voice recognition button 2250 for driving the sound receiving unit 2240 from the remote controller 2230.

Alternatively, the sound receiving unit 2240 of the remote controller 2230 may be configured to be driven as soon as a power button for driving the multimedia device 2200 is pressed. Alternatively, the sound receiving unit 2240 of the remote controller 2230 may be configured to be driven by a drive signal received from the multimedia device 2200. Alternatively, the sound receiving unit 2240 of the remote controller 2230 may be configured to be driven by a motion pattern of the remote controller 2230.

Figure 25:
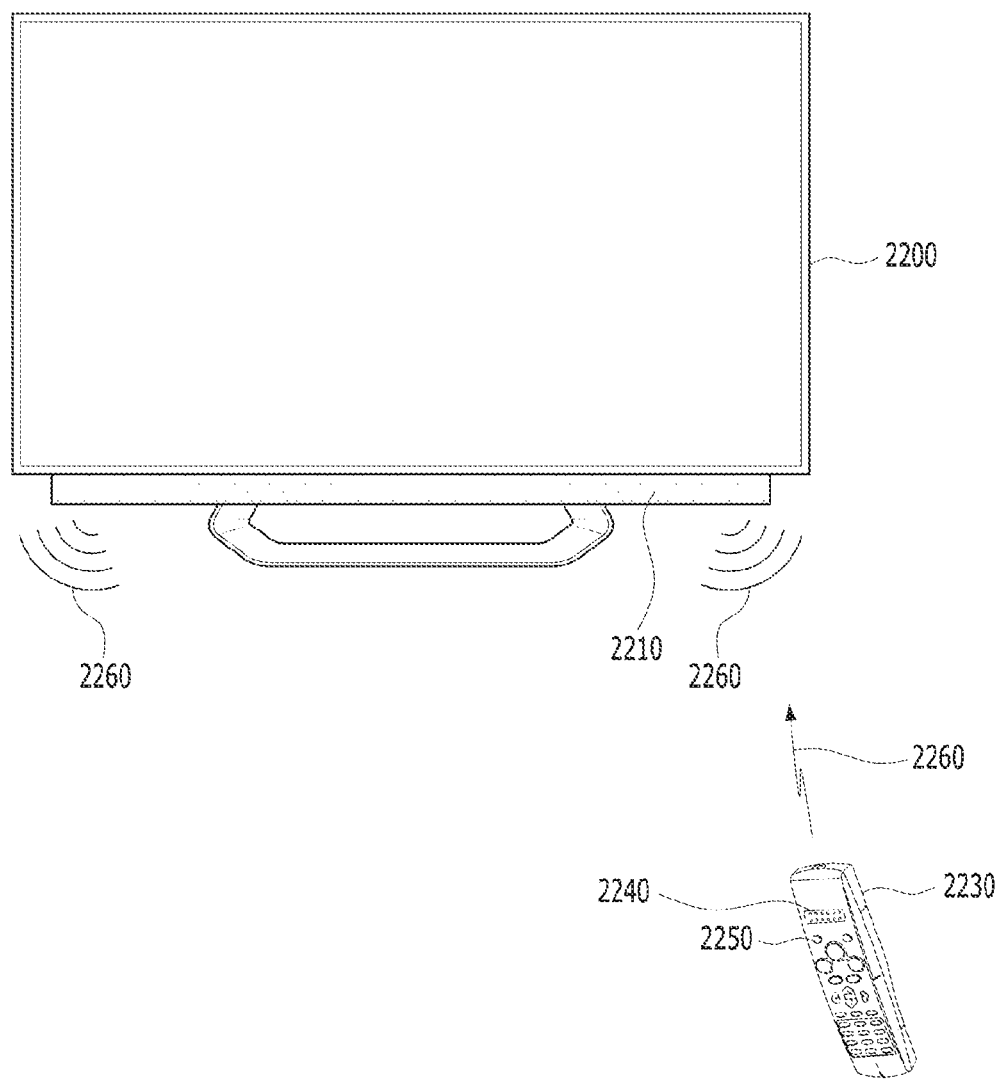

Referring to FIG. 25, if the voice recognition button 2250 of the remote controller 2230 is pressed, the multimedia device 2200 output a test sound 2260 through the sound output unit 2210. And, the remote controller 2230 can receive the test sound 2260 through the sound receiving unit 2240.

Figure 26:
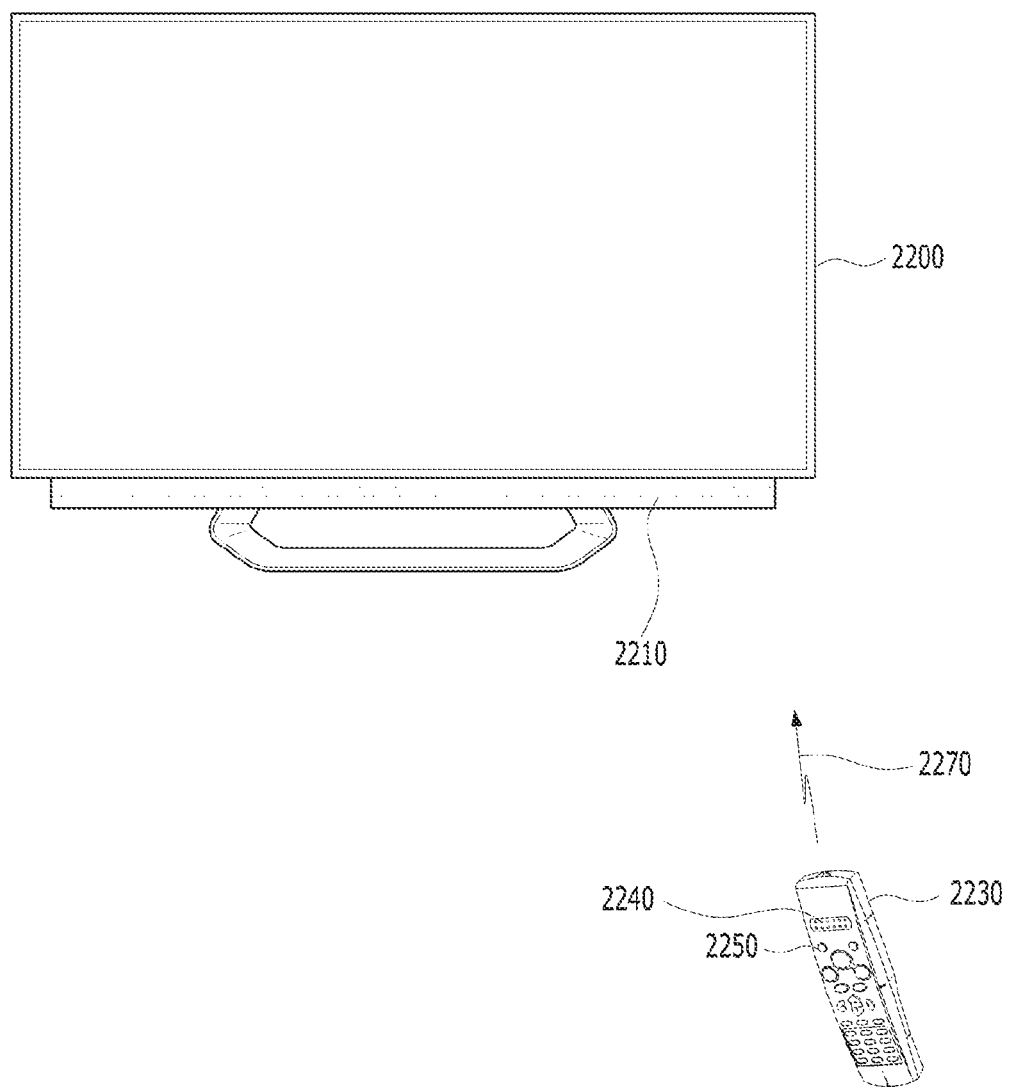

Referring to FIG. 26, in case that the remote controller 2230 includes the sound receiving unit 2240 such as a microphone or the like only, the remote controller 2230 receives the test sound through the sound receiving unit 2240 and is able to send an analog signal of the test sound to the multimedia device 2200.

Herein, the multimedia device 2200 receives the analog signal of the test sound 2270, converts the test sound from an analog signal into a digital signal through an audio signal converting and processing unit for processing a signal by converting an analog signal into a digital signal, and then signal-processes the test sound converted into the digital signal.

Thereafter, the multimedia device 2200 calculates a compensation value of the test sound, corrects an audio signal to output according to the compensation value through an audio signal compensating unit, and then outputs the corrected audio signal.

For another instance, if the remote controller 2230 includes an audio signal processing unit and a memory as well as the sound receiving unit 2240, the remote controller 2230 receives a test sound through the sound receiving unit 2240, signal-processes the received test sound through the audio signal processing unit, and sends the signal-processed test sound to the multimedia device 2200.

Herein, the multimedia device 2200 receives the signal-processed test sound 2270, calculates a compensation value of the test sound, corrects an audio signal to output according to the compensation value through the audio signal compensating unit, and is then able to output the corrected audio signal.

For further instance, if the remote controller 2230 includes an audio signal converting unit for converting an analog signal into a digital signal as well as the sound receiving unit 2240, the remote controller 2230 receives a test sound through the sound receiving unit 2240, converts the test sound into a digital signal from an analog signal, and sends the converted test sound to the multimedia device 2200.

Herein, the multimedia device 2200 signal-processes the test sound converted into the digital signal through the audio signal processing unit, calculates a compensation value of the test sound, corrects an audio signal to output according to the compensation value through an audio signal compensating unit, and then outputs the corrected audio signal.

FIGS. 27 to 31 are diagrams showing an audio compensation associated user interface according to one embodiment of the present invention.

Figure 27:
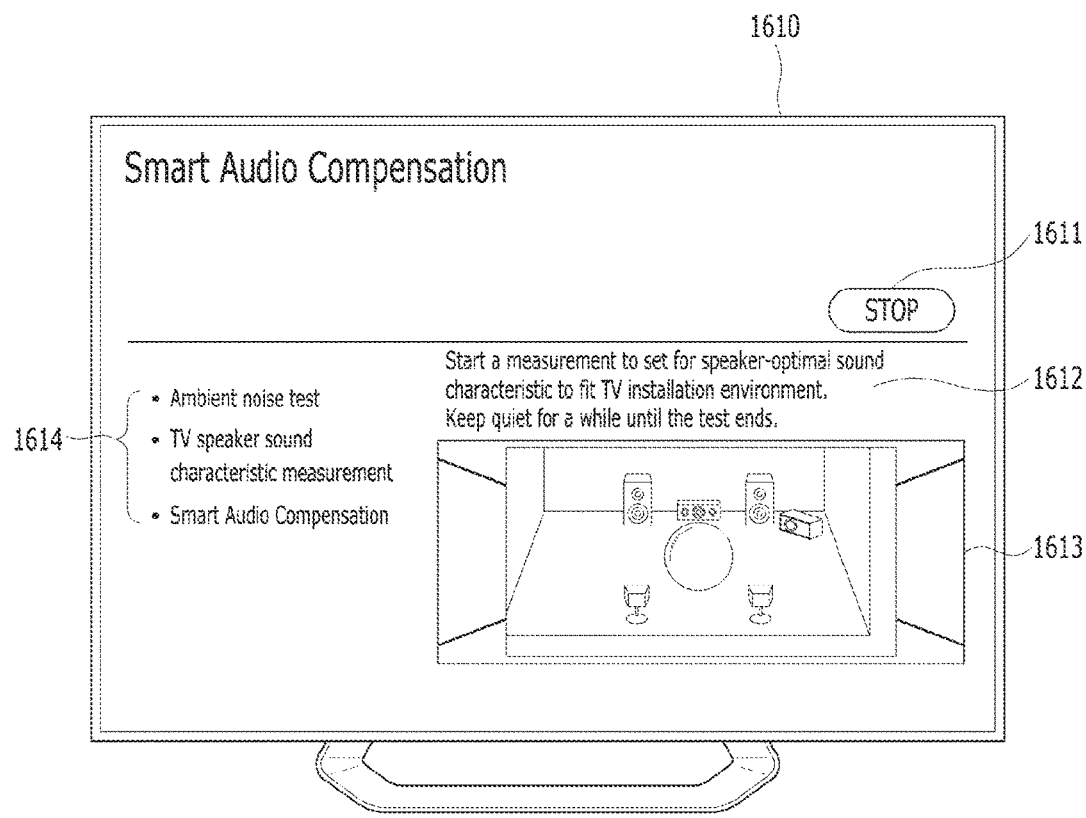
FIGS. 27 to 31 are diagrams showing an audio compensation associated user interface according to one embodiment of the present invention.

Referring to FIG. 27, in response to a user's sound environment setting request, a multimedia device may display an audio compensation associated screen window 1610 on a display.

Herein, in the audio compensation associated screen window 1610, a start button item 1611 for requesting a start of an audio compensation operation, an information window displaying a description associated with the start of the audio compensation operation, an image window 1613 associated with the description of the information window, and sub-operation items 1614 in the audio compensation operation may be included.

For instance, the sub-operation items 1614 in the audio compensation operation may include an ambient noise test item, a speaker sound characteristic measurement item, and an audio compensation item.

A user can progress the audio compensation operation of the multimedia device through the audio compensation associated screen window 1610.

Figure 28:
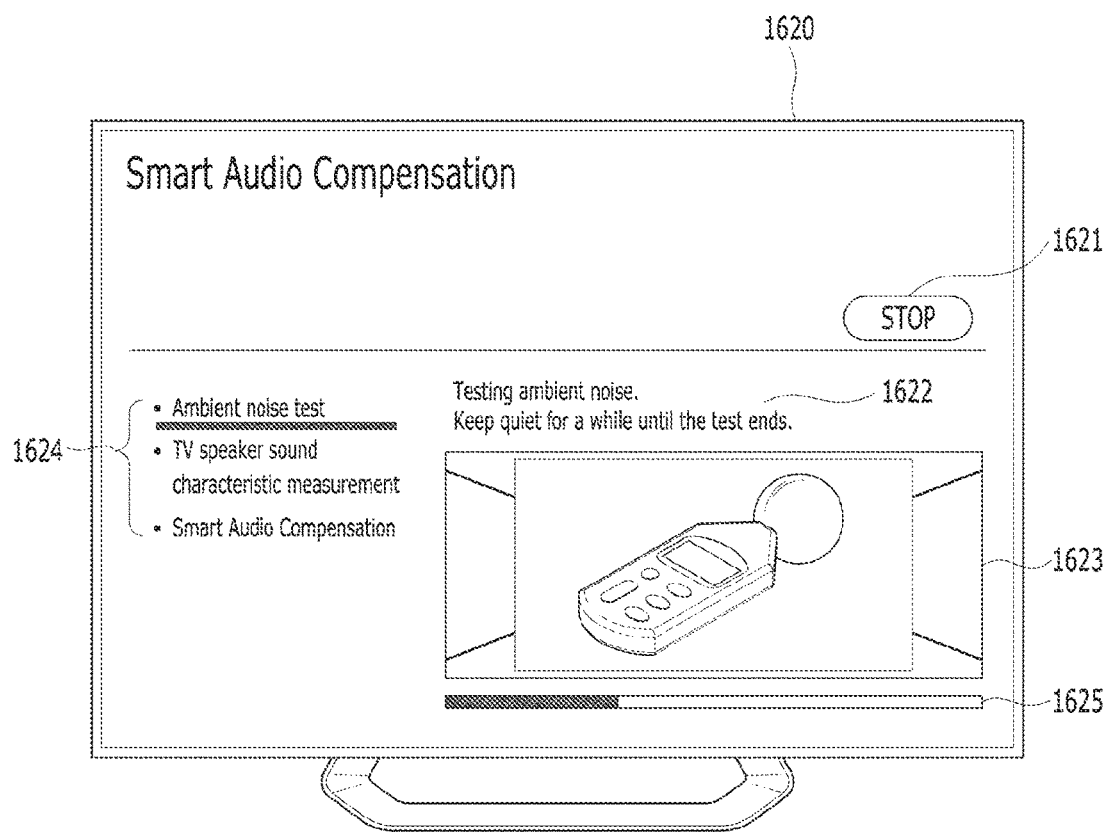

Referring to FIG. 28, if the user selects the start button item for requesting the start of the audio compensation operation from the audio compensation associated screen window 1620, the start button item is changed into a stop button item 1621. And, the multimedia device can perform an ambient noise test item associated operation among the sub-operation items 1624 in the audio compensation operation.

An information window 1622 displaying an ambient noise test associated description and a description associated image window 1623 of the information window are displayed. And, a time bar 1625 indicating an ambient noise test item associated operation progress level can be displayed.

If a noise greater than a basic setting value is received from an ambient environment, the multimedia device may skip the ambient noise test item associated operation.

Figure 29:
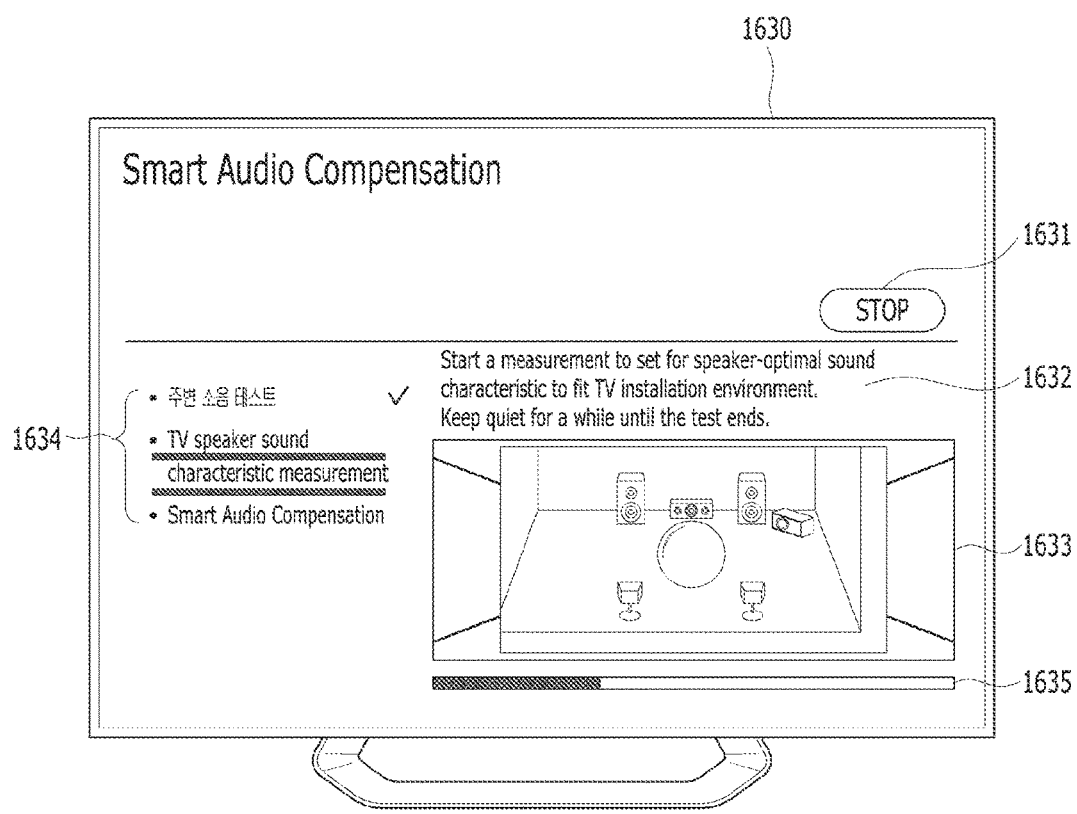

Referring to FIG. 29, if the ambient noise test item associated operation is completed, the multimedia device may perform a speaker sound characteristic measurement item associated operation among the sub-operation items 1634 in the audio compensation operation automatically and continuously.

In doing so, the user may stop the speaker sound measurement operation by selecting the stop button item 1631 if necessary.

An information window 1632 displaying a speaker sound measurement associated description and a description associated image window 1633 of the information window are displayed. And, a time bar 1635 indicating a speaker sound measurement associated operation progress level can be displayed.

Figure 30:
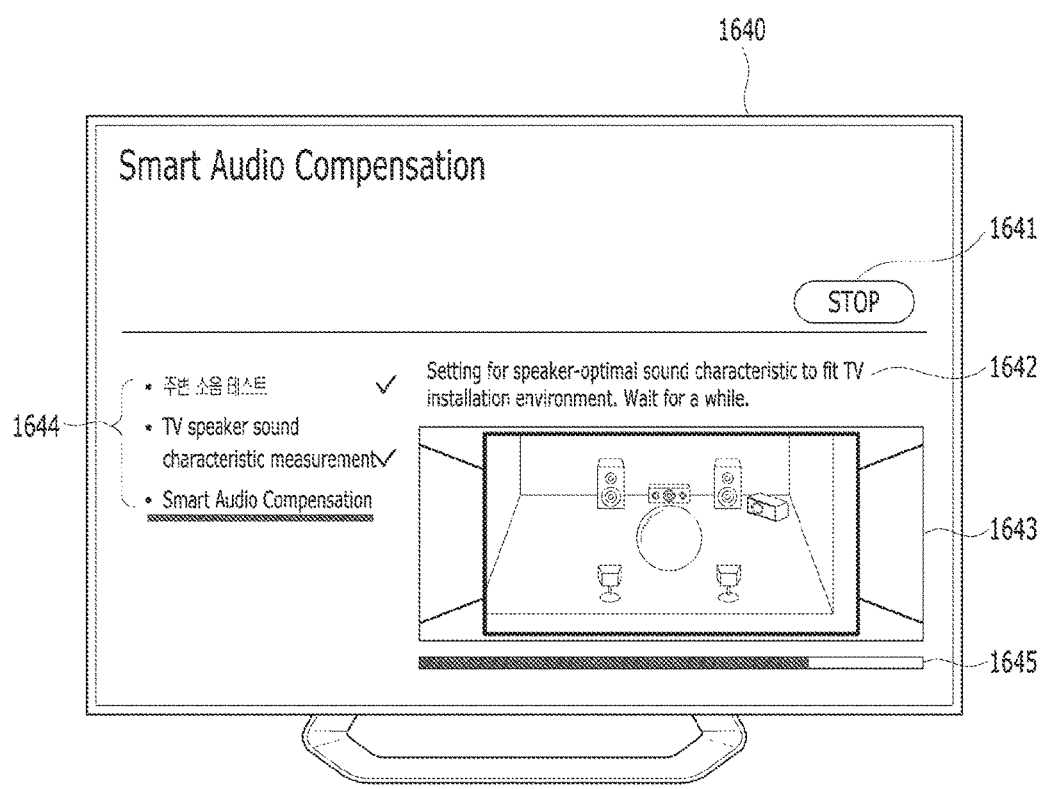

Referring to FIG. 30, if the speaker sound characteristic measurement item associated operation is completed, the multimedia device can perform the audio compensation item associated operation among the sub-operation items 1644 in the audio compensation operation.

In doing so, the user may stop the audio compensation operation by selecting the stop button item 1641 if necessary.

An information window 1642 displaying an audio compensation operation associated description and a description associated image window 1643 of the information window are displayed. And, a time bar 1645 indicating an audio compensation item associated operation progress level can be displayed.

Figure 31:
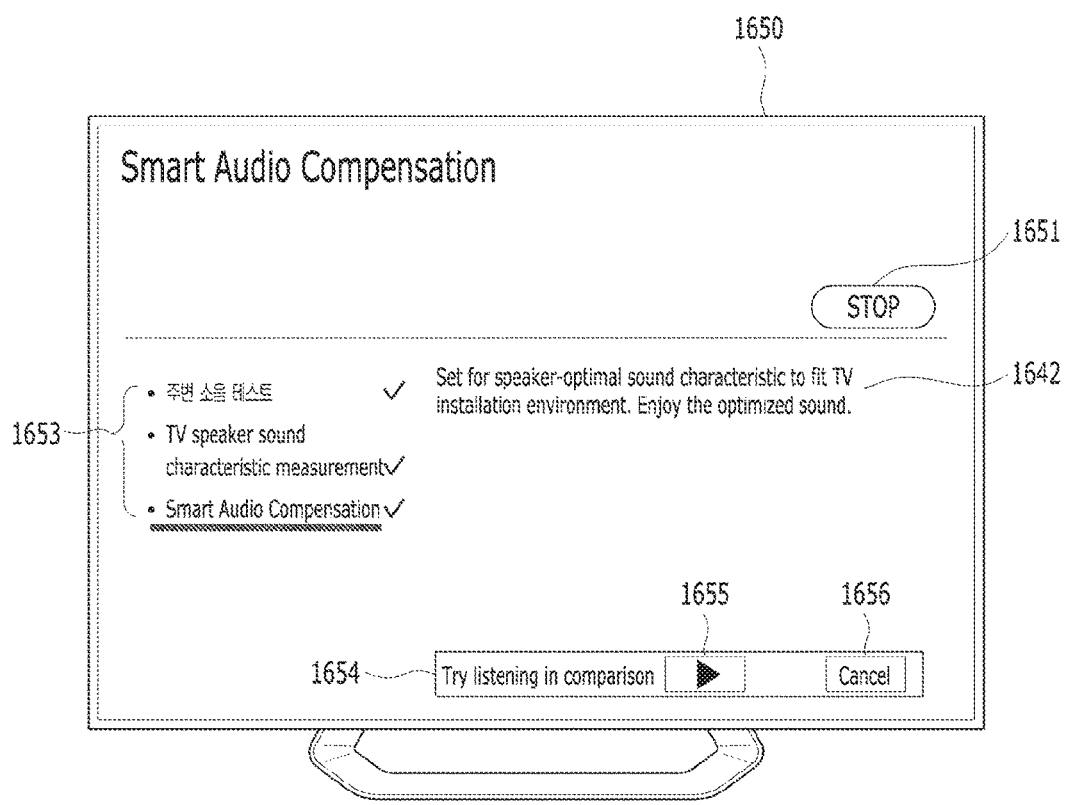

Thereafter, referring to FIG. 31, if all the sub-operation items 1653 in the audio compensation operation are completed, the stop button item is changed into a complete button item 1651 and the multimedia device displays an audio compensation operation completion associated description on the information window 1652.

And, the multimedia device may display a sound quality comparison play window 1654 to enable a user to listen to a sound quality before the audio compensation and a sound quality after the audio compensation.

Herein, on the sound quality comparison play window 1654, a play button 1655 and a cancel button 1656 may be displayed together.

If the user selects the cancel button 1656, a currently setting completed audio compensation setting is cancelled and the multimedia device can return to an audio setting state before the setting.

Figure 32:
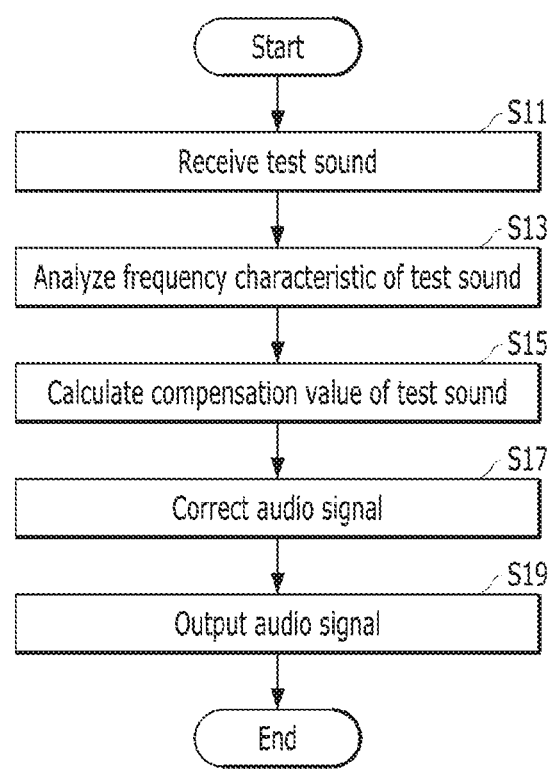
FIG. 32 is a flowchart showing a method of processing an audio signal in a multimedia device according to one embodiment of the present invention.

FIG. 32 is a flowchart showing a method of processing an audio signal in a multimedia device according to one embodiment of the present invention.

Referring to FIG. 32, first of all, a multimedia device may receive an external test sound [S11].

Herein, the test sound may include at least one of a preset white noise signal, a preset sweep signal, and a sound signal of a currently displayed video.

Moreover, the test sound may include noise generated from external ambience.

The multimedia device may analyze frequency characteristic of the received test sound [S13], and calculate a compensation value of the test sound according to the analyzed frequency characteristic [S15].

Herein, the multimedia device may create and display a manual/auto adjustment selection window. If the manual adjustment is selected through the manual/auto adjustment selection window, the multimedia device may create and display a compensation value manual adjustment window including the frequency characteristic of the test sound.

Alternatively, the multimedia device may create and display a manual/auto adjustment selection window. If the manual adjustment is selected through the manual/auto adjustment selection window, the multimedia device may create and display a compensation value manual adjustment window including the frequency characteristic of the test sound and a recommended compensation value corresponding to each frequency of the test sound.

Subsequently, the multimedia device may correct an audio signal to output according to the calculated compensation value [S17] and output the corrected audio signal [S19].

Herein, when the multimedia device analyzes frequency characteristic of a test sound, the multimedia device may analyze a noise signal associated with external noise and then adjust a volume level of an audio signal according to a strength of the analyzed noise signal. When the multimedia device analyzes frequency characteristic of a test sound, the multimedia device may analyze a volume of a sound according to user's channel switching and then adjust a volume level of an audio signal uniformly according to the analyzed volume.

Figure 33:
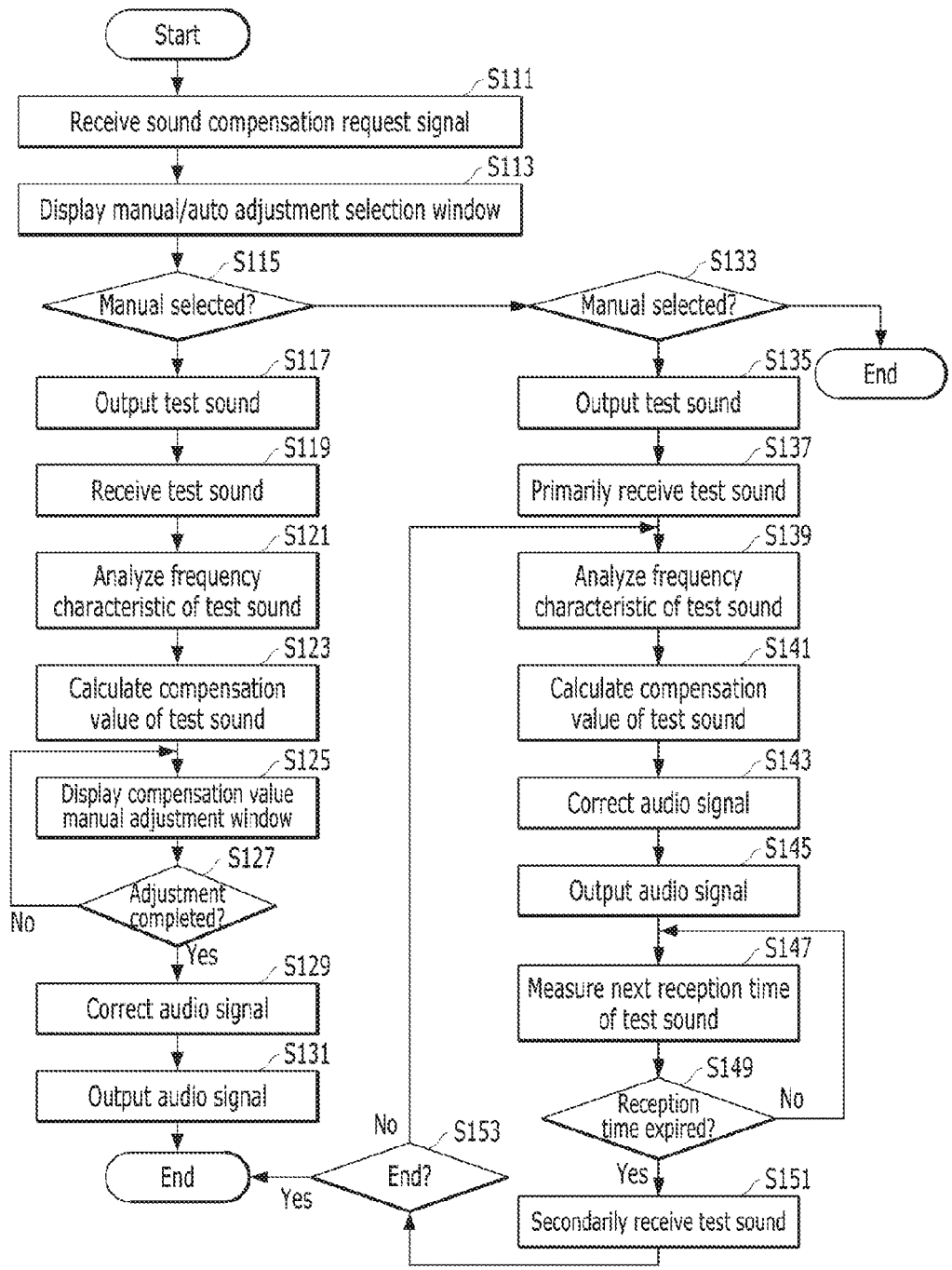
FIG. 33 is a flowchart showing a method of processing an audio signal in a multimedia device according to another embodiment of the present invention.

FIG. 33 is a flowchart showing a method of processing an audio signal in a multimedia device according to another embodiment of the present invention.

Referring to FIG. 33, first of all, a multimedia device checks whether a sound compensation request signal is received from a user. If the sound compensation request signal is received [S111], the multimedia device may create and display a manual/audio adjustment selection window for sound compensation and then display it [S113].

In doing so, the manual/auto adjustment selection window may display selection items for compensating a sound environment manually or automatically.

If manual adjustment is selected through the manual/auto adjustment selection window [S115], the multimedia device may output a test sound through a sound output unit [S117].

Herein, the outputted test sound may include at least one of a preset white noise signal, a preset sweep signal, and a sound signal of a currently displayed video.

The multimedia device may receive the outputted test sound [S119] and then analyze frequency characteristic of the received test sound [S121].

For instance, the test sound may have distortion occur in a low range band or a middle range band according to an installation environment of the multimedia device.

Hence, the multimedia device may calculate a compensation value of the test sound according to the analyzed frequency characteristic [S123].

And, the multimedia device may display a compensation value manual adjustment window including the frequency characteristic of the test sound [S125].

Herein, the frequency characteristic of the test sound, which is included in the compensation value manual adjustment window, may represent a frequency strength for each frequency as a prescribed shape such as a bar type.

The compensation value of the test sound may be adjusted in a manner of being selected per frequency of the test sound by a user.

In some cases, the compensation value of the test sound can be adjusted in a manner that a user makes a primary selection per frequency band of the test sound and then makes a secondary selection per frequency of the primarily selected frequency band.

Herein, if a user adjusts a compensation value by selecting a specific frequency from frequencies of the primarily selected frequency band, the rest of the frequencies of the primarily selected frequency band can be simultaneously adjusted for compensation values according to an adjustment rate.

The compensation value manual adjustment window may include a recommended compensation value corresponding to each frequency of the test sound.

Herein, the recommended compensation value may be displayed in a prescribed shape such as a bar type to correspond to each frequency of the test sound.

The recommended compensation value may be adjusted by a user's selection. If a user adjusts a prescribed one of the recommended compensation values of the respective frequencies, the corresponding recommended compensation value is adjusted only but the rest of the recommended compensation values may be maintained.

Alternatively, if a user adjusts a prescribed one of the recommended compensation values of the respective frequencies, the rest of the recommended compensation values may be simultaneously adjusted according to an adjustment rate.

Subsequently, if the adjustment of the compensation value is completed through the compensation value manual adjustment window [S127], the multimedia device may correct an audio signal to output according to the adjustment complete compensation value [S129] and output the corrected audio signal [5131].

Meanwhile, in the step S115 of displaying the manual/auto adjustment selection window for the sound compensation, if auto adjustment is selected through the manual/auto adjustment selection window [S133], the multimedia device may output a preset test sound [S135], receive the outputted test sound primarily [S137], and then analyze frequency characteristic of the received test sound [S139].

And, the multimedia device may calculate a compensation value of the test sound according to the analyzed frequency characteristic [S141].

The multimedia device may correct an audio signal to output according to the calculated compensation value [S143] and output the corrected audio signal [S145].

Subsequently, the multimedia device may measure a next reception time of test sound [S147].

The multimedia device checks whether a preset reception time expires [S149]. If the reception time expires, the multimedia device may secondarily receive a currently outputted test sound [S151].

Namely, if auto adjustment is selected through the manual/auto adjustment selection window, the multimedia device receives a currently outputted test sound according to a preset predetermined period.

Thus, the multimedia device corrects an audio signal to output according to the calculated compensation value and then outputs the corrected audio signal.

Thereafter, the multimedia device checks whether the analysis of the secondarily received test sound is ended [S153]. If such an analysis is not ended, the multimedia device may repeatedly perform the step S139 of analyzing the frequency characteristic of the test sound and its following steps.

Accordingly, the present invention always outputs an optimal sound in various environments, thereby providing user convenience without limitations put on installation environments as well as providing a user with a satisfiable sound quality service.

MODE FOR INVENTION

The multimedia device and audio signal processing method thereof disclosed in the present specification can be achieved by combination of structural elements and features of the present invention. Each of the structural elements or features should be considered selectively unless specified separately. Also, some structural elements and/or features may be combined with one another to enable various modifications of the embodiments of the present invention.

The audio signal processing method of a multimedia device disclosed in the present specification can be implemented in a program recorded medium as processor-readable codes. The processor-readable media may include all kinds of recording devices in which data readable by a processor are stored. The processor-readable media may include ROM, RAM, CD-ROM, magnetic tapes, floppy discs, optical data storage devices, and the like for example and also include carrier-wave type implementations (e.g., transmission via Internet). Further, the recording medium readable by a processor is distributed to a computer system connected to a network, whereby codes readable by the processor by distribution can be saved and executed.

It will be appreciated by those skilled in the art that various modifications and variations can be made in the present invention without departing from the spirit or scope of the inventions. Thus, it is intended that the present invention covers the modifications and variations of this invention provided they come within the scope of the appended claims and their equivalents.

INDUSTRIAL APPLICABILITY

The present invention relates to a multimedia device and method of processing an audio signal therein, suitable for servicing optimized sound according to an ambient environment. Therefore, the present invention has industrial applicability.

What is claimed is:

1. A method of processing an audio signal in a multimedia device, comprising:
   receiving an external test sound;
   analyzing frequency characteristic of the received test sound;
   calculating a compensation value of the test sound according to the analyzed frequency characteristic;
   correcting an audio signal to output according to the calculated compensation value; and
   outputting the corrected audio signal,
   wherein receiving the external test sound comprises:
   receiving a sound compensation request signal;
   if the sound compensation request signal is received, displaying a manual/auto adjustment selection window for the sound compensation;
   if manual adjustment is selected through the manual/auto adjustment selection window, outputting the test sound; and
   receiving the outputted test sound.

2. The method of claim 1, wherein after receiving the test sound, a compensation value manual adjustment window including the frequency characteristic of the received test sound is displayed.

3. The method of claim 2, wherein the frequency characteristic of the test sound included in the compensation value manual adjustment window represents a frequency strength of each frequency as a prescribed shape.

4. The method of claim 3, wherein the compensation value of the test sound is adjusted in a manner of being selected per frequency of the test sound by a user.

5. The method of claim 3, wherein the compensation value of the test sound is adjusted in a manner that a user makes a primary selection per frequency band of the test sound and a secondary selection per frequency of the primarily selected frequency band.

6. The method of claim 5, wherein if the user adjusts the compensation value by selecting a specific frequency from frequencies of the primarily selected frequency band, compensation values of the rest of frequencies of the primarily selected frequency band are simultaneously adjusted according to an adjustment rate.

7. The method of claim 2, wherein the compensation value manual adjustment window includes a recommended compensation value corresponding to each frequency of the test sound.

8. The method of claim 7, wherein the recommended compensation value is displayed in a prescribed shape to correspond to each frequency of the test sound.

9. The method of claim 7, wherein the recommended compensation value is adjusted by a user's selection.

10. The method of claim 9, wherein if the user adjusts a prescribed one of recommended compensation values of the respective frequencies, the corresponding recommended compensation value is adjusted only but the rest of the recommended compensation values are maintained.

11. The method of claim 9, wherein if the user adjusts a prescribed one of recommended compensation values of the respective frequencies, the rest of the recommended compensation values are simultaneously adjusted according to the adjustment rate.

12. The method of claim 1, wherein the displaying the manual/auto adjustment selection window for the sound compensation comprises:
   if auto adjustment is selected through the manual/auto adjustment selection window, outputting the test sound;
   receiving the outputted test sound;
   measuring a next reception time of the test sound;
   checking whether a preset reception time expires; and
   if the reception time expires, receiving a currently outputted test sound.

13. The method of claim 1, wherein the outputted test sound comprises at least one selected from the group consisting of a preset white noise signal, a preset sweep signal, and a sound signal of a currently displayed video.

14. A multimedia device, comprising:
   a sound receiving module receiving an external test sound;
   a sound transmitting module outputting the test sound;
   a display module displaying a manual/auto adjustment selection window for sound compensation; and
   a controller configured to:
   analyze frequency characteristic of the received test sound,
   calculate a compensation value of the test sound according to the analyzed frequency characteristic,
   correct an audio signal to output according to the calculated compensation value, and
   output the corrected audio signal,
   wherein when the controller analyzes the frequency characteristic of the test sound, the controller analyzes a noise signal associated with external noise and then adjusts a volume level of the audio signal according to a strength of the analyzed noise signal, and analyzes a volume of a sound according to user's channel switching and then adjusts a volume level of the audio signal uniformly according to the analyzed volume.

15. The multimedia device of claim 14, wherein if manual adjustment is selected through the manual/auto adjustment selection window, the controller creates a compensation value manual adjustment window including the frequency characteristic of the received test sound and displays the created window on the display module.

16. The multimedia device of claim 14, wherein if manual adjustment is selected through the manual/auto adjustment selection window, the controller creates a compensation value manual adjustment window including the frequency characteristic of the received test sound and a recommended compensation value corresponding to each frequency of the test sound and displays the created window on the display module.

17. The multimedia device of claim 14, wherein the sound receiving module is included in a camera module.

18. The multimedia device of claim 17, wherein the camera module comprises an audio signal processing unit configured to signal-process the test sound received from the sound receiving module and send the signal-processed test sound to the controller.

* * * * *